United States Patent
Chhichhia et al.

(10) Patent No.: US 9,852,132 B2
(45) Date of Patent: Dec. 26, 2017

(54) BUILDING A TOPICAL LEARNING MODEL IN A CONTENT MANAGEMENT SYSTEM

(71) Applicant: Chegg, Inc., Santa Clara, CA (US)

(72) Inventors: Charmy Chhichhia, San Jose, CA (US); Vincent Le Chevalier, San Jose, CA (US)

(73) Assignee: CHEGG, INC., Santa Clara, CA (US)

( * ) Notice: Subject to any disclaimer, the term of this patent is extended or adjusted under 35 U.S.C. 154(b) by 314 days.

(21) Appl. No.: 14/553,798

(22) Filed: Nov. 25, 2014

(65) Prior Publication Data

US 2016/0147891 A1    May 26, 2016

(51) Int. Cl.
    *G06F 17/30* (2006.01)
(52) U.S. Cl.
    CPC .. *G06F 17/30011* (2013.01); *G06F 17/30412* (2013.01); *G06F 17/30598* (2013.01); *G06F 17/30699* (2013.01); *G06F 17/30867* (2013.01); *G06F 17/30896* (2013.01)
(58) Field of Classification Search
    CPC ......... G06F 17/30598; G06F 17/30864; G06F 17/3071; G06F 17/30873; G06F 17/30539; G06F 17/30867; G06F 17/30705; G06F 17/30253; G06F 17/30412; G06F 17/3001; G06F 17/30979; G06F 17/30994; G06F 17/30896; G06C 30/0631; G06Q 10/107
    See application file for complete search history.

(56) References Cited

U.S. PATENT DOCUMENTS

| 7,162,471 | B1 * | 1/2007 | Knight | G06F 17/30864 707/750 |
| 7,899,871 | B1 * | 3/2011 | Kumar | G06Q 10/107 709/206 |
| 8,122,031 | B1 * | 2/2012 | Mauro | G06F 17/3071 707/727 |
| 8,458,197 | B1 * | 6/2013 | Procopio | G06F 17/3061 707/749 |
| 2004/0254768 | A1 * | 12/2004 | Kim | G06F 17/30539 702/189 |
| 2006/0041843 | A1 * | 2/2006 | Billsus | G06Q 30/02 715/714 |
| 2006/0242158 | A1 * | 10/2006 | Ursitti | G06F 17/24 |
| 2008/0040314 | A1 * | 2/2008 | Brave | G06F 17/30867 |

(Continued)

FOREIGN PATENT DOCUMENTS

WO   WO 2009/134462   * 11/2009

*Primary Examiner* — Srirama Channavajjala
(74) *Attorney, Agent, or Firm* — Fenwick & West LLP

(57) ABSTRACT

A content management system receives a plurality of topics extracted from documents stored by the system. Pairings between the topics are generated, where a pairing between two topics is generated responsive to the two topics appearing in proximity to one another in one or more of the documents. A complexity of each received topic is also determined. The content management system generates a progression of the topics based on the complexity of the topics and the pairings between the topics. The progression comprises a sequential ordering of paired topics, in which a topic in the ordering has a higher complexity than a preceding topic. Responsive to a user of the content management system accessing content associated with a topic in the progression, a next topic in the progression is recommended to the user.

18 Claims, 23 Drawing Sheets

(56) References Cited

U.S. PATENT DOCUMENTS

| | | | |
|---|---|---|---|
| 2008/0114755 A1* | 5/2008 | Wolters | G06F 17/30873 |
| 2009/0083261 A1* | 3/2009 | Nagano | G06F 17/30864 |
| 2010/0088295 A1* | 4/2010 | Duan | G06F 17/30253 |
| | | | 707/705 |
| 2010/0161382 A1* | 6/2010 | Cole | G06F 17/30867 |
| | | | 705/7.32 |
| 2010/0312769 A1* | 12/2010 | Bailey | G06F 17/30705 |
| | | | 707/740 |
| 2011/0072052 A1* | 3/2011 | Skarin | G06Q 10/10 |
| | | | 707/794 |
| 2012/0089621 A1* | 4/2012 | Liu | G06F 17/30699 |
| | | | 707/749 |
| 2013/0124437 A1* | 5/2013 | Pennacchiotti | G06Q 30/0255 |
| | | | 706/12 |
| 2017/0124600 A1* | 5/2017 | Katzen | G06Q 30/0277 |

\* cited by examiner

| Predicted Entity Label \ Actual Entity Label | Textbook | Course | Q&A | Total |
|---|---|---|---|---|
| Textbook | 0 | 40 | 20 | 60 |
| Course | 50 | 0 | 10 | 60 |
| Q&A | 40 | 20 | 0 | 60 |
| Total | 90 | 60 | 30 | |

FIG. 9

BUILDING A TOPICAL LEARNING MODEL IN A CONTENT MANAGEMENT SYSTEM

BACKGROUND

Field of the Disclosure

This disclosure relates to generating a progression of topics in a content management system.

Description of the Related Art

The successful deployment of electronic textbooks and educational materials by education publishing platforms has introduced multiple alternatives to the traditional print textbook marketplace. By integrating new and compelling digital education services into core academic material, these publishing platforms provide students and instructors with access to a wide range of collaborative tools and solutions that are rapidly changing the way courses are constructed and delivered.

As traditional courses are shifting from a static textbook-centric model to a connected one where related, personalized, and other social-based content activities are being aggregated dynamically within the core academic material, it becomes strategic for education publishing platforms to be able to extract topically-relevant content from large-scale academic libraries. However, conventional techniques are not well suited to extracting and organizing topics in an environment with a wide variety of content types, as found for example in educational systems. For example, separate systems are often needed to extract topics from each type of content. Deploying these separate systems results in high resource investments and scalability issues, and do not provide a unified relationship between topics extracted from different types of content.

SUMMARY

A content management system storing electronic documents generates topic progressions to recommend topics to users of the content management system. Topics, which include words or phrases appearing in a document, are extracted from the electronic documents stored by the content management system. The content management system generates pairings between the topics based on the locations of the topics in the documents. For example, the content management system pairs two topics if the topics appear in proximity to one another in one or more of the documents. The content management system also generates complexity measures for the topics. In one embodiment, the content management system generates an academic complexity measure for a topic, representing the complexity of the documents including the topic relative to the complexity of other documents stored by the system, and a document complexity measure for the topic, representing the complexity of the topic within a document relative to the complexity of other topics in the document.

The content management system uses the topic complexities to generate a progression of topics. The progression comprises a sequential ordering of paired topics, in which each topic in the ordering has a higher complexity than a preceding topic. After a user of the content management system accesses content associated with a topic in the progression, the content management system recommends a next topic in the progression to the user. In one embodiment, the content management system displays an identifier of the recommended topic to the user that is selectable to access a document or portion of a document including the recommended topic. The progression therefore enables the user to easily navigate content of the content management system to study progressively more challenging topics.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 9 illustrates an example confusion matrix used to determine feature overlap between content entities, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Embodiments described herein provide for extraction, analysis, and organization of topics in a content management system. In one embodiment, the content management system classifies document into a hierarchical taxonomy. Topics are extracted from the documents, and the topics are analyzed to determine a complexity of each topic. The content management system uses the topic complexities to generate a progression of the topics. The topic extraction systems and methods described herein provide a user with an intuitive tool for navigating content of the content management system according to topics.

One example content management system managing a wide diversity of documents is an education publishing platform configured for digital content interactive services distribution and consumption. In the platform, personalized learning services are paired with secured distribution and analytics systems for reporting on both connected user activities and effectiveness of deployed services. The education platform manages educational services through the organization, distribution, and analysis of electronic documents.

Figure 1:
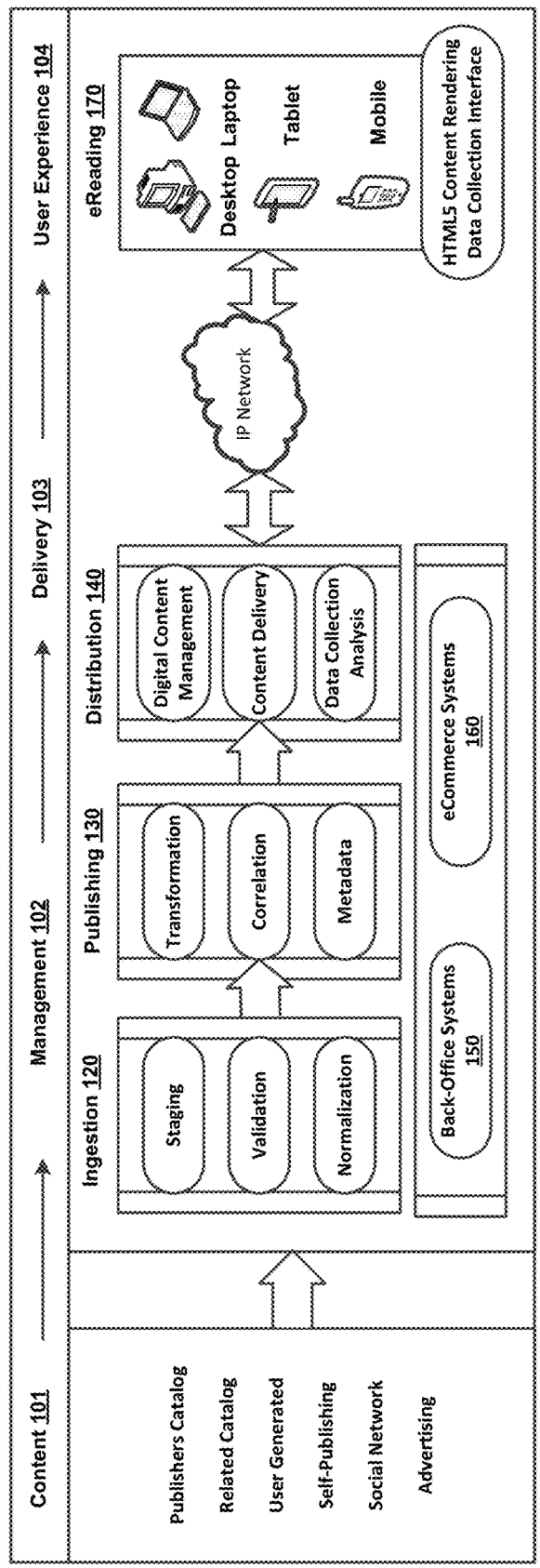
FIG. 1 illustrates an example education platform, according to one embodiment.

FIG. 1 is a high-level block diagram illustrating the education platform environment 100. The education platform environment 100 is organized around four function blocks: content 101, management 102, delivery 103, and experience 104.

Content block 101 automatically gathers and aggregates content from a large number of sources, categories, and partners. Whether the content is curated, perishable, on-line, or personal, these systems define the interfaces and processes to automatically collect various content sources into a formalized staging environment.

Management block 102 comprises five blocks with respective submodules: ingestion 120, publishing 130, distribution 140, back office system 150, and eCommerce system 160. The ingestion module 120, including staging, validation, and normalization subsystems, ingests published documents that may be in a variety of different formats, such as PDF, ePUB2, ePUB3, SVG, XML, or HTML. The ingested document may be a book (such as a textbook), a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130, which in one embodiment includes transformation, correlation, and metadata subsystems. If the document ingested by the ingestion module 120 is not in a markup language format, the publishing system 130 automatically identifies, extracts, and indexes all the key elements and composition of the document to reconstruct it into a modern, flexible, and interactive HTML5 format. The ingested documents are converted into markup language documents well-suited for distribution across various computing devices. In one embodiment, the publishing system 130 reconstructs published documents so as to accommodate dynamic add-ons, such as user-generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

The page structure information is assembled into a document-specific table of contents describing locations of chapter headings and sub-chapter headings within the reconstructed document, as well as locations of content within each heading. During reconstruction, document metadata describing a product description, pricing, and terms (e.g., whether the content is for sale, rent, or subscription, or whether it is accessible for a certain time period or geographic region, etc.) are also added to the reconstructed document.

The reconstructed document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure. The process performed by the publishing system 130 to reconstruct a document and generate a table of contents is described further with respect to FIG. 3.

The distribution system 140 packages content for delivery, uploads the content to content distribution networks, and makes the content available to end users based on the content's digital rights management policies. In one embodiment, the distribution system 140 includes digital content management, content delivery, and data collection and analysis subsystems.

Whether the ingested document is in a markup language document or is reconstructed by the publishing system 130, the distribution system 140 may aggregate additional content layers from numerous sources into the ingested or reconstructed document. These layers, including related content, advertising content, social content, and user-generated content, may be added to the document to create a dynamic, multilayered document. For example, related content may comprise material supplementing the foundation document, such as study guides, textbook solutions, self-testing material, solutions manuals, glossaries, or journal articles. Advertising content may be uploaded by advertisers or advertising agencies to the publishing platform, such that advertising content may be displayed with the document. Social content may be uploaded to the publishing platform by the user or by other nodes (e.g., classmates, teachers, authors, etc.) in the user's social graph. Examples of social content include interactions between users related to the document and content shared by members of the user's social graph. User-generated content includes annotations made by a user during an eReading session, such as highlighting or taking notes. In one embodiment, user-generated content may be self-published by a user and made available to other users as a related content layer associated with a document or as a standalone document.

As layers are added to the document, page information and metadata of the document are referenced by all layers to merge the multilayered document into a single reading experience. The publishing system 130 may also add information describing the supplemental layers to the reconstructed document's table of contents. Because the page-based document ingested into the management block 102 or the reconstructed document generated by the publishing system 130 is referenced by all associated content layers, the ingested or reconstructed document is referred to herein as a "foundation document," while the "multilayered document" refers to a foundation document and the additional content layers associated with the foundation document.

The back-office system 150 of management block 102 enables business processes such as human resources tasks, sales and marketing, customer and client interactions, and technical support. The eCommerce system 160 interfaces with back office system 150, publishing 130, and distribution 140 to integrate marketing, selling, servicing, and receiving payment for digital products and services.

Delivery block 103 of an educational digital publication and reading platform distributes content for user consumption by, for example, pushing content to edge servers on a content delivery network. Experience block 104 manages user interaction with the publishing platform through browser application 170 by updating content, reporting users' reading and other educational activities to be recorded by the platform, and assessing network performance.

In the example illustrated in FIG. 1, the content distribution and protection system is interfaced directly between the distribution sub-system 140 and the browser application 170, essentially integrating the digital content management (DCM), content delivery network (CDN), delivery modules, and eReading data collection interface for capturing and serving all users' content requests. By having content served dynamically and mostly on-demand, the content distribution and protection system effectively authorizes the download of one page of content at a time through time-sensitive dedicated URLs which only stay valid for a limited time, for example a few minutes in one embodiment, all under control of the platform service provider.

Platform Content Processing and Distribution

Figure 2:
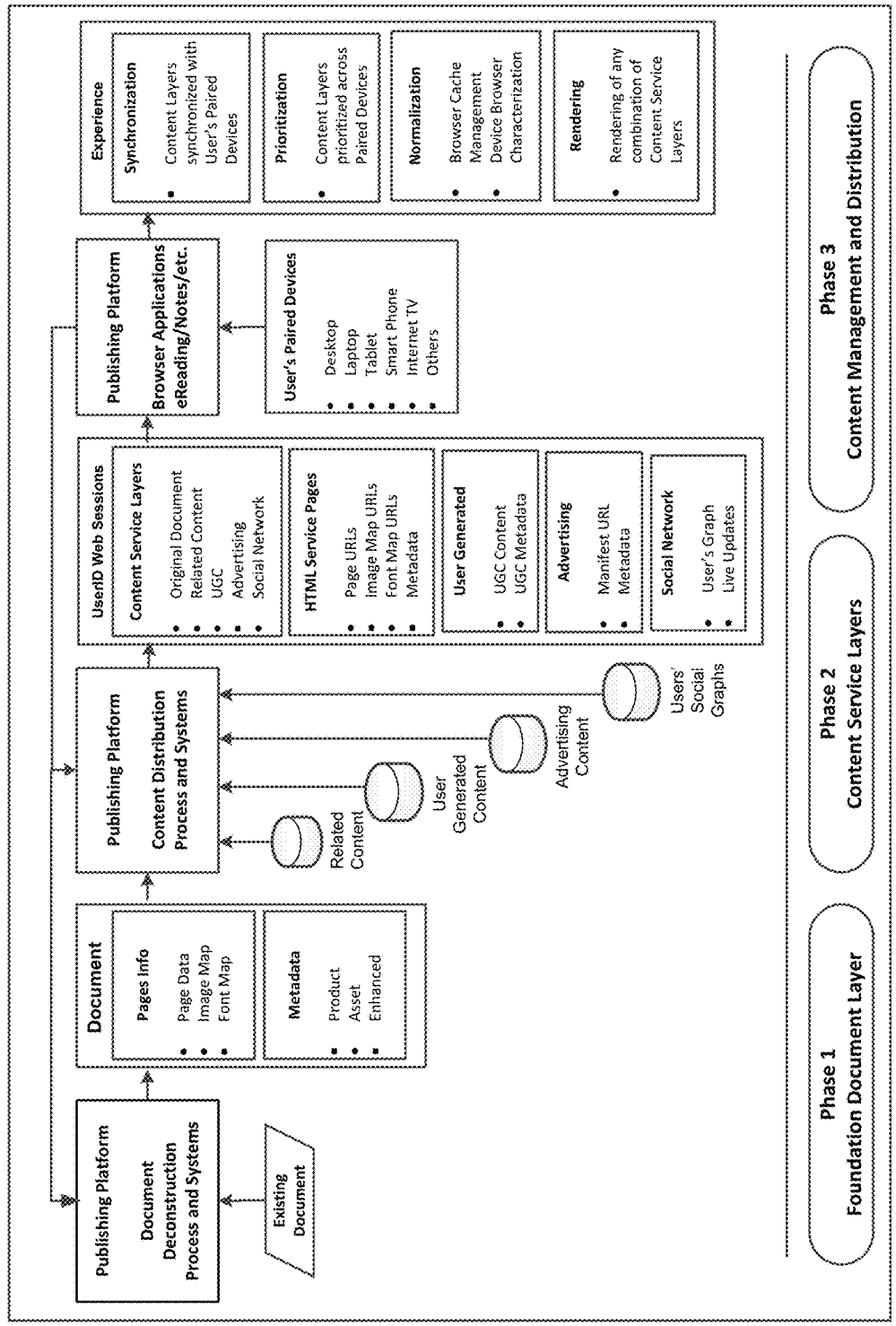
FIG. 2 is a block diagram illustrating interactions with an education platform, according to one embodiment.

The platform content catalog is a mosaic of multiple content sources which are collectively processed and assembled into the overall content service offering. The content catalog is based upon multilayered publications that are created from reconstructed foundation documents augmented by supplemental content material resulting from users' activities and platform back-end processes. FIG. 2 illustrates an example of a publishing platform where multilayered content document services are assembled and distributed to desktop, mobile, tablet, and other connected devices. As illustrated in FIG. 2, the process is typically segmented into three phases: Phase 1: creation of the foundation document layer; Phase 2: association of the content service layers to the foundation document layer; and Phase 3: management and distribution of the content.

During Phase 1, the licensed document is ingested into the publishing platform and automatically reconstructed into a series of basic elements, while maintaining page fidelity to the original document structure. Document reconstruction will be described in more detail below with reference to FIG. 3.

During Phase 2, once a foundation document has been reconstructed and its various elements extracted, the publishing platform runs several processes to enhance the reconstructed document and transform it into a personalized multilayered content experience. For instance, several distinct processes are run to identify the related content to the reconstructed document, user generated content created by registered users accessing the reconstructed document, advertising or merchandising material that can be identified by the platform and indexed within the foundation document and its layers, and social network content resulting from registered users' activities. By having each of these processes focusing on specific classes of content and databases, the elements referenced within each classes become identified by their respective content layer. Specifically, all the related content page-based elements that are matched with a particular reconstructed document are classified as part of the related content layer. Similarly, all other document enhancement processes, including user generated, advertising and social among others, are classified by their specific content layer. The outcome of Phase 2 is a series of static and dynamic page-based content layers that are logically stacked on top of each other and which collectively enhance the reconstructed foundation document.

During Phase 3, once the various content layers have been identified and processed, the resulting multilayered documents are then published to the platform content catalog and pushed to the content servers and distribution network for distribution. By having multilayered content services served dynamically and on-demand through secured authenticated web sessions, the content distribution systems are effectively authorizing and directing the real-time download of page-based layered content services to a user's connected devices. These devices access the services through time sensitive dedicated URLs which, in one embodiment, only stay valid for a few minutes, all under control of the platform service provider. The browser-based applications are embedded, for example, into HTML5 compliant web browsers which control the fetching, requesting, synchronization, prioritization, normalization and rendering of all available content services.

Document Reconstruction

The publishing system 130 receives original documents for reconstruction from the ingestion system 120 illustrated in FIG. 1. In one embodiment, a series of modules of the publishing system 130 are configured to perform the document reconstruction process.

Figure 3:
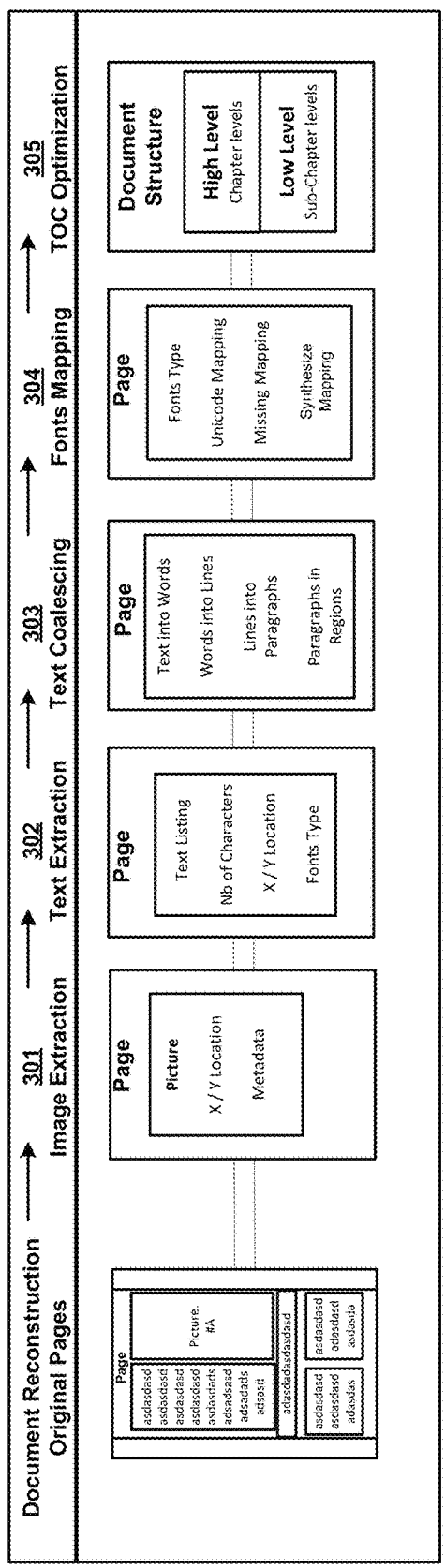
FIG. 3 illustrates a document reconstruction process, according to one embodiment.

FIG. 3 illustrates a process within the publishing system 130 for reconstructing a document. Embodiments are described herein with reference to an original document in the Portable Document Format (PDF) that is ingested into the publishing system 130. However, the format of the original document is not limited to PDF; other unstructured document formats can also be reconstructed into a markup language format by a similar process.

A PDF page contains one or more content streams, which include a sequence of objects, such as path objects, text objects, and external objects. A path object describes vector graphics made up of lines, rectangles, and curves. A path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

During image extraction 301, graphical objects within a page are identified and their respective regions and bounding boxes are determined. For example, a path object in a PDF page may include multiple path construction operators that describe vector graphics made up of lines, rectangles, and curves. Metadata associated with each of the images in the document page is extracted, such as resolutions, positions, and captions of the images. Resolution of an image is often measured by horizontal and vertical pixel counts in the image; higher resolution means more image details. The image extraction process may extract the image in the original resolution as well as other resolutions targeting different eReading devices and applications. For example, a large XVGA image can be extracted and down sampled to QVGA size for a device with QVGA display. The position information of each image may also be determined. The position information of the images can be used to provide page fidelity when rendering the document pages in eReading browser applications, especially for complex documents containing multiple images per page. A caption associated with each image that defines the content of the image may also be extracted by searching for key words, such as "Picture", "Image", and "Tables", from text around the image in the original page. The extracted image metadata for the page may be stored to the overall document metadata and indexed by the page number.

Image extraction 301 may also extract tables, comprising graphics (horizontal and vertical lines), text rows, and/or text columns. The lines forming the tables can be extracted and stored separately from the rows and columns of the text.

The image extraction process may be repeated for all the pages in the ingested document until all images in each page are identified and extracted. At the end of the process, an image map that includes all graphics, images, tables and other graphic elements of the document is generated for the eReading platform.

During text extraction 302, text and embedded fonts are extracted from the original document and the location of the text elements on each page are identified.

Text is extracted from the pages of the original document tagged as having text. The text extraction may be done at the individual character level, together with markers separating words, lines, and paragraphs. The extracted text characters and glyphs are represented by the Unicode character mapping determined for each. The position of each character is identified by its horizontal and vertical locations within a page. For example, if an original page is in A4 standard size, the location of a character on the page can be defined by its X and Y location relative to the A4 page dimensions. In one embodiment, text extraction is performed on a page-by-page basis. Embedded fonts may also be extracted from the original document, which are stored and referenced by client devices for rendering the text content.

The pages in the original document having text are tagged as having text. In one embodiment, all the pages with one or more text objects in the original document are tagged. Alternatively, only the pages without any embedded text are marked.

The output of text extraction 302, therefore, a dataset referenced by the page number, comprising the characters and glyphs in a Unicode character mapping with associated location information and embedded fonts used in the original document.

Text coalescing 303 coalesces the text characters previously extracted. In one embodiment, the extracted text characters are coalesced into words, words into lines, lines into paragraphs, and paragraphs into bounding boxes and regions. These steps leverage the known attributes about extracted text in each page, such as information on the text position within the page, text direction (e.g., left to right, or top to bottom), font type (e.g., Arial or Courier), font style (e.g., bold or italic), expected spacing between characters based on font type and style, and other graphics state parameters of the pages.

In one embodiment, text coalescence into words is performed based on spacing. The spacing between adjacent characters is analyzed and compared to the expected character spacing based on the known text direction, font type, style, and size, as well as other graphics state parameters, such as character-spacing and zoom level. Despite different rendering engines adopted by the browser applications 170, the average spacing between adjacent characters within a word is smaller than the spacing between adjacent words. For example, a string of "Berriesaregood" represents extracted characters without considering spacing information. Once taking the spacing into consideration, the same string becomes "Berries are good," in which the average character spacing within a word is smaller than the spacing between words.

Additionally or alternatively, extracted text characters may be assembled into words based on semantics. For example, the string of "Berriesaregood" may be input to a semantic analysis tool, which matches the string to dictionary entries or Internet search terms, and outputs the longest match found within the string. The outcome of this process is a semantically meaningful string of "Berries are good." In one embodiment, the same text is analyzed by both spacing and semantics, so that word grouping results may be verified and enhanced.

Words may be assembled into lines by determining an end point of each line of text. Based on the text direction, the horizontal spacing between words may be computed and averaged. The end point may have word spacing larger than the average spacing between words. For example, in a two-column page, the end of the line of the first column may be identified based on it having a spacing value much larger than the average word spacing within the column. On a single column page, the end of the line may be identified by the space after a word extending to the side of the page or bounding box.

After determining the end point of each line, lines may be assembled into paragraphs. Based on the text direction, the average vertical spacing between consecutive lines can be computed. The end of the paragraph may have a vertical spacing that is larger than the average. Additionally or alternatively, semantic analysis may be applied to relate syntactic structures of phrases and sentences, so that meaningful paragraphs can be formed.

The identified paragraphs may be assembled into bounding boxes or regions. In one embodiment, the paragraphs may be analyzed based on lexical rules associated with the corresponding language of the text. A semantic analyzer may be executed to identify punctuation at the beginning or end of a paragraph. For example, a paragraph may be expected to end with a period. If the end of a paragraph does not have a period, the paragraph may continue either on a next column or a next page. The syntactic structures of the paragraphs may be analyzed to determine the text flow from one paragraph to the next, and may combine two or more paragraphs based on the syntactic structure. If multiple combinations of the paragraphs are possible, reference may be made to an external lexical database, such as WORD-NET®, to determine which paragraphs are semantically similar.

In fonts mapping 304, in one embodiment, a Unicode character mapping for each glyph in a document to be reconstructed is determined. The mapping ensures that no two glyphs are mapped to a same Unicode character. To achieve this goal, a set of rules is defined and followed, including applying the Unicode mapping found in the embedded font file; determining the Unicode mapping by looking up postscript character names in a standard table, such as a system TrueType font dictionary; and determining the Unicode mapping by looking for patterns, such as hex codes, postscript name variants, and ligature notations.

For those glyphs or symbols that cannot be mapped by following the above rules, pattern recognition techniques may be applied on the rendered font to identify Unicode characters. If pattern recognition is still unsuccessful, the unrecognized characters may be mapped into the private use area (PUA) of Unicode. In this case, the semantics of the characters are not identified, but the encoding uniqueness is guaranteed. As such, rendering ensures fidelity to the original document.

In table of contents optimization 305, content of the reconstructed document is indexed. In one embodiment, the indexed content is aggregated into a document-specific table of contents that describes the structure of the document at the page level. For example, when converting printed publications into electronic documents with preservation of page fidelity, it may be desirable to keep the digital page numbering consistent with the numbering of the original document pages.

The table of contents may be optimized at different levels of the table. At the primary level, the chapter headings within the original document, such as headings for a preface, chapter numbers, chapter titles, an appendix, and a glossary may be indexed. A chapter heading may be found based on the spacing between chapters. Alternatively, a chapter heading may be found based on the font face, including font type, style, weight, or size. For example, the headings may have a font face that is different from the font face used throughout the rest of the document. After identifying the headings, the number of the page on which each heading is located is retrieved.

At a secondary level, sub-chapter headings within the original document may be identified, such as dedications and acknowledgments, section titles, image captions, and table titles. Vertical spacing between sections, text, and/or font face may be used to segment each chapter. For example, each chapter may be parsed to identify all occurrences of the sub-chapter heading font face, and determine the page number associated with each identified sub-chapter heading.

Education Publishing Platform

Figure 4:
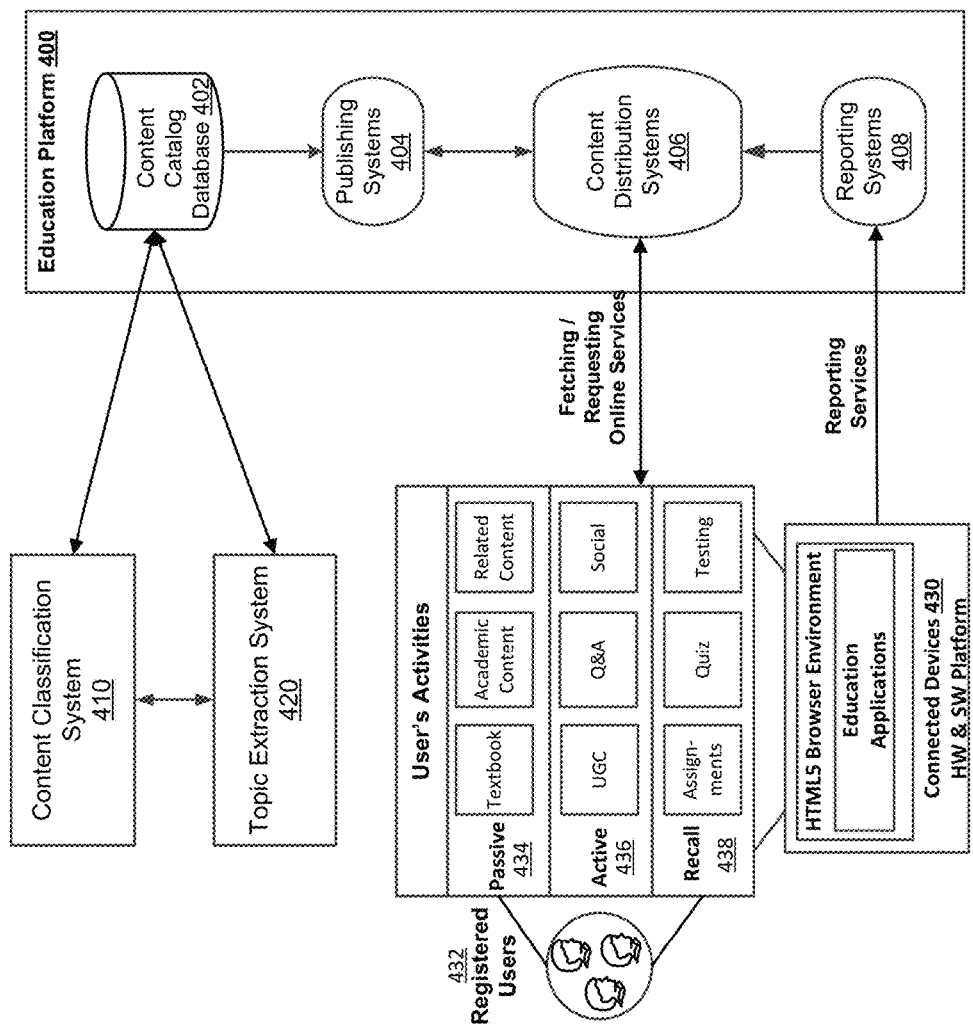
FIG. 4 illustrates an education publishing platform, according to one embodiment.

FIG. 4 illustrates an education publishing platform 400, according to one embodiment. As shown in FIG. 4, the education publishing platform 400 communicates with a content classification system 410, a topic extraction system 420, and user devices 430. The education platform 400 may have components in common with the functional blocks of the platform environment 100, and the HTML5 browser environment executing on the user devices 430 may be the same as the eReading application 170 of the experience block 104 of the platform environment 100 or the functionality may be implemented in different systems or modules.

The education platform 400 serves education services to registered users 432 based on a process of requesting and fetching on-line services in the context of authenticated on-line sessions. In the example illustrated in FIG. 4, the education platform 400 includes a content catalog database 402, publishing systems 404, content distribution systems 406, and reporting systems 408. The content catalog database 402 contains the collection of content available via the education platform 402. In one embodiment, the content catalog database 402 includes a number of content entities, such as textbooks, courses, jobs, and videos. The content entities each include a set of documents of a similar type. For example, a textbooks content entity is a set of electronic textbooks or portions of textbooks. A courses content entity is a set of documents describing courses, such as course syllabi. A jobs content entity is a set of documents relating to jobs or job openings, such as descriptions of job openings. A videos content entity is a set of video transcripts. The content catalog database 402 may include numerous other content entities. Furthermore, custom content entities may be defined for a subset of users of the education platform 400, such as sets of documents associated with a particular topic, school, educational course, or professional organization. The documents associated with each content entity may be in a variety of different formats, such as plain text, HTML, JSON, XML, or others.

The content catalog database 402 feeds content to the publishing systems 404. The publishing systems 404 serve the content to registered users 432 via the content distribution system 406. The reporting systems 408 receive reports of user experience and user activities from the connected devices 430 operated by the registered users 432. This feedback is used by the content distribution systems 406 for managing the distribution of the content and for capturing user-generated content and other forms of user activities to add to the content catalog database 402. In one embodiment, the user-generated content is added to a user-generated content entity of the content catalog database 402.

Registered users access the content distributed by the content distribution systems 406 via browser-based education applications executing on a user device 430. As users interact with content via the connected devices 430, the reporting systems 408 receive reports about various types of user activities, broadly categorized as passive activities 434, active activities 436, and recall activities 438. Passive activities 434 include registered users' passive interactions with published academic content materials, such as reading a textbook. These activities are defined as "passive" because they are typically orchestrated by each user around multiple online reading authenticated sessions when accessing the structured HTML referenced documents. By directly handling the fetching and requesting of all HTML course-based document pages for its registered users, the connected education platform analyzes the passive reading activities of registered users.

Activities are defined as "active" when registered users are interacting with academic documents by creating their own user generated content (user-generated content) layer as managed by the platform services. By contrast to "passive" activities, where content is predetermined and static, the process of creating user generated content is unique to each user, both in terms of actual material, format, frequency, or structure, for example. In this instance, user-generated content is defined by the creation of personal notes, highlights, and other comments, or interacting with other registered users 432 through the education platform 400 while accessing the referenced HTML documents. Other types of user-generated content include asking questions when help is needed, solving problems associated with particular sections of course-based HTML documents, and connecting and exchanging feedback with peers, among others. These user-generated content activities are authenticated through on-line "active" sessions that are processed and correlated by the platform content distribution system 406 and reporting system 408.

Recall activities 438 test registered users against knowledge acquired from their passive and active activities. In some cases, recall activities 438 are used by instructors of educational courses for evaluating the registered users in the course, such as through homework assignments, tests, quizzes, and the like. In other cases, users complete recall activities 438 to study information learned from their passive activities, for example by using flashcards, solving problems provided in a textbook or other course materials, or accessing textbook solutions. In contrast to the passive and active sessions, recall activities can be orchestrated around combined predetermined content material with user-generated content. For example, the assignments, quizzes, and other testing materials associated with a course and its curriculum are typically predefined and offered to registered users as structured documents that are enhanced once personal content is added into them. Typically, a set of predetermined questions, aggregated by the platform 400 into digital testing material, is a structured HTML document that is published either as a stand-alone document or as supplemental to a foundation document. By contrast, the individual answers to these questions are expressed as user-generated content in some testing-like activities. When registered users are answering questions as part of a recall activity, the resulting authenticated on-line sessions are processed and correlated by the platform content distribution 406 and reporting systems 408.

A shown in FIG. 4, the education platform 400 is in communication with a content classification system 410 and a topic extraction system 420. The content classification system 410 classifies content of the education platform 400 into a hierarchical taxonomy. The topic extraction system 420 extracts topics from the content of the education platform 400 and associates the topics with the classifications generated by the content classification system 410. The content classification system 410 and the topic extraction system 420 may be subsystems of the education platform 400, or may operate independently of the education platform 400. For example, the content classification system 410 and the topic extraction system 420 may communicate with the education platform 400 over a network, such as the Internet.

The content classification system 410 assigns taxonomic labels to documents in the content catalog database 402 to classify the documents into a hierarchical taxonomy. In particular, the content classification system 410 trains a model for assigning taxonomic labels to a representative content entity, which is a content entity determined to have a high degree of similarity to the other content entities of the catalog database 402. One or more taxonomic labels are assigned to documents of other content entities using the model trained for the representative content entity. Using the assigned labels, the content classification system 410 classifies the documents. Accordingly, the content classification system 410 classifies diverse documents using a single learned model, rather than training a new model for each content entity.

In one embodiment, the content classification system 410 generates a user interface displaying the hierarchical taxonomy to users of the education platform 400. For example, users can use the interface to browse the content of the education platform 400, identifying textbooks, courses, videos, or any other types of content related to subjects of interest to the users. In another embodiment, the content classification system 410 or the education platform 400 recommends content to users based on the classification of the documents. For example, if a user has accessed course documents through the education platform 400, the education platform 400 may recommend textbooks related to the same subject matter as the course to the user.

The topic extraction system 420 extracts topics from documents in the content catalog database 402. Each topic is a phrase of one or more terms appearing in text of a document. For each extracted topic, the topic extraction system 420 determines an affinity of the topic to various branches of the hierarchical taxonomy. The affinities are used to generate a topic graph identifying nodes of the hierarchical taxonomy and a plurality of topics linked to the nodes. In one embodiment, the topic graph is displayed to a user as an interface for navigating content of the content catalog database 402. For example, if a user selects one of the topics in the topic graph, a list of documents including the selected topic are displayed to the user. The topic extraction system 420 also generates a progression of topics extracted from the documents in the content catalog database 402. In one embodiment, the progression of topics is a sequence of topics ordered according to complexity of the topics. Using the progression, the topic extraction system 420 recommends topics to a user.

Content Classification

Figure 5:
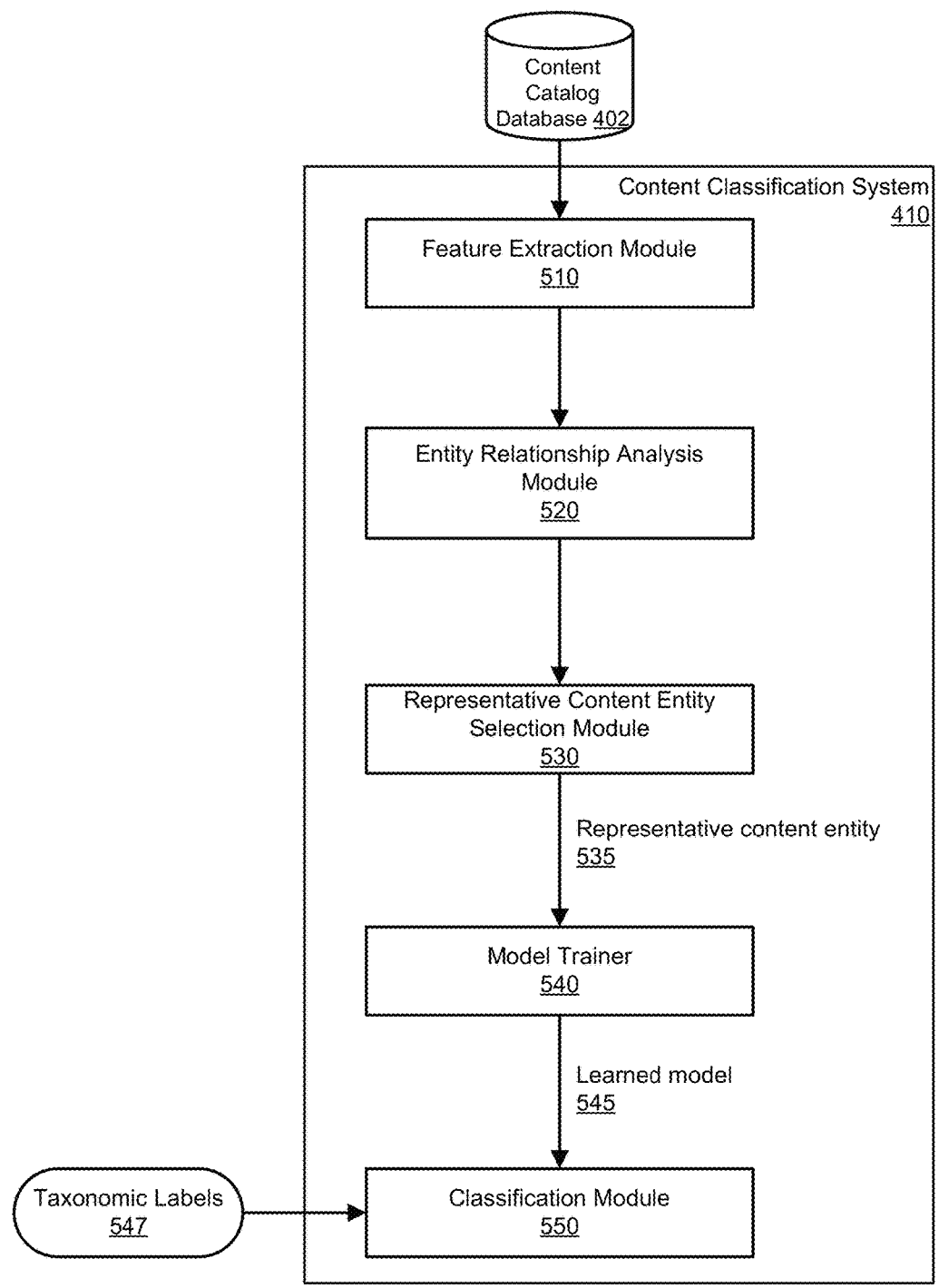
FIG. 5 is a block diagram illustrating modules within a content classification system, according to one embodiment.

FIG. 5 is a block diagram illustrating modules within the content classification system 410, according to one embodiment. In one embodiment, the content classification system 410 executes a feature extraction module 510, an entity relationship analysis module 520, a representative content entity selection module 530, a model trainer 540, and a classification module 550. Other embodiments of the content classification system 410 may include fewer, additional, or different modules, and the functionality may be distributed differently among the modules.

The feature extraction module 510 extracts features from documents in the content catalog database 402. In one embodiment, the feature extraction module 510 analyzes metadata of the documents, such as titles, authors, descriptions, and keywords, to extract features from the documents. A process performed by the feature extraction module 510 to extract features from documents in the content catalog database 402 is described with respect to FIG. 6.

The entity relationship analysis module 520 analyzes relationships between the content entities hosted by the education platform 400. In one embodiment, the entity relationship analysis module 520 determines a similarity between the content entities based on the feature vectors received from the feature extraction module 510. The entity relationship analysis module uses the document features to determine a similarity between each content entity and each of the other content entities. For example, the entity relationship analysis module 520 builds a classifier to classify documents of one content entity into each of the other content entities based on the documents' features. The number of documents of a first content entity classified as a second content entity is indicative of a similarity between the first content entity and the second content entity. An example process performed by the entity relationship analysis module 520 to analyze relationships between content entities is described with respect to FIG. 7.

The representative content entity selection module 530 selects one of the content entities hosted by the education platform 400 as a representative content entity 535. In one embodiment, the representative content entity selection module 530 selects a content entity having a high degree of similarity to the other content entities as the representative content entity 535. For example, the representative content entity selection module 530 selects a content entity having a high feature overlap with each of the other content entities, such that the representative content entity 535 is sufficiently representative of the feature space of the other content entities. An example process performed by the representative content entity selection module 530 for selecting the representative content entity is described with respect to FIG. 8.

The model trainer 540 trains a model for assigning taxonomic labels to documents of the representative content entity 535. A training set of documents of the representative content entity that have been tagged with taxonomic labels is received. The model trainer 540 extracts features from the training documents and uses the features to train a model 545 for assigning taxonomic labels to an arbitrary document. A process performed by the model trainer 540 for generating the learned model is described with respect to FIG. 10.

The classification module 550 applies the model 545 trained for the representative content entity to documents of other content entities to classify the documents. The classification module 550 receives a set of taxonomic labels 547, which collectively define a hierarchical taxonomy. A hierarchical taxonomy for educational content includes categories and subjects within each category. For example, art, engineering, history, and philosophy are categories in the educational hierarchical taxonomy, and mechanical engineering, biomedical engineering, computer science, and electrical engineering are subjects within the engineering category. The taxonomic labels 547 may include any number of hierarchical levels. The classification module 550 assigns one or more taxonomic labels to each document of the other content entities using the learned model 545, and classifies the documents based on the applied labels. A process performed by the classification module for assigning taxonomic labels to documents using the learned model 545 is described with respect to FIG. 11.

Representative Content Entity Selection

Figure 6:
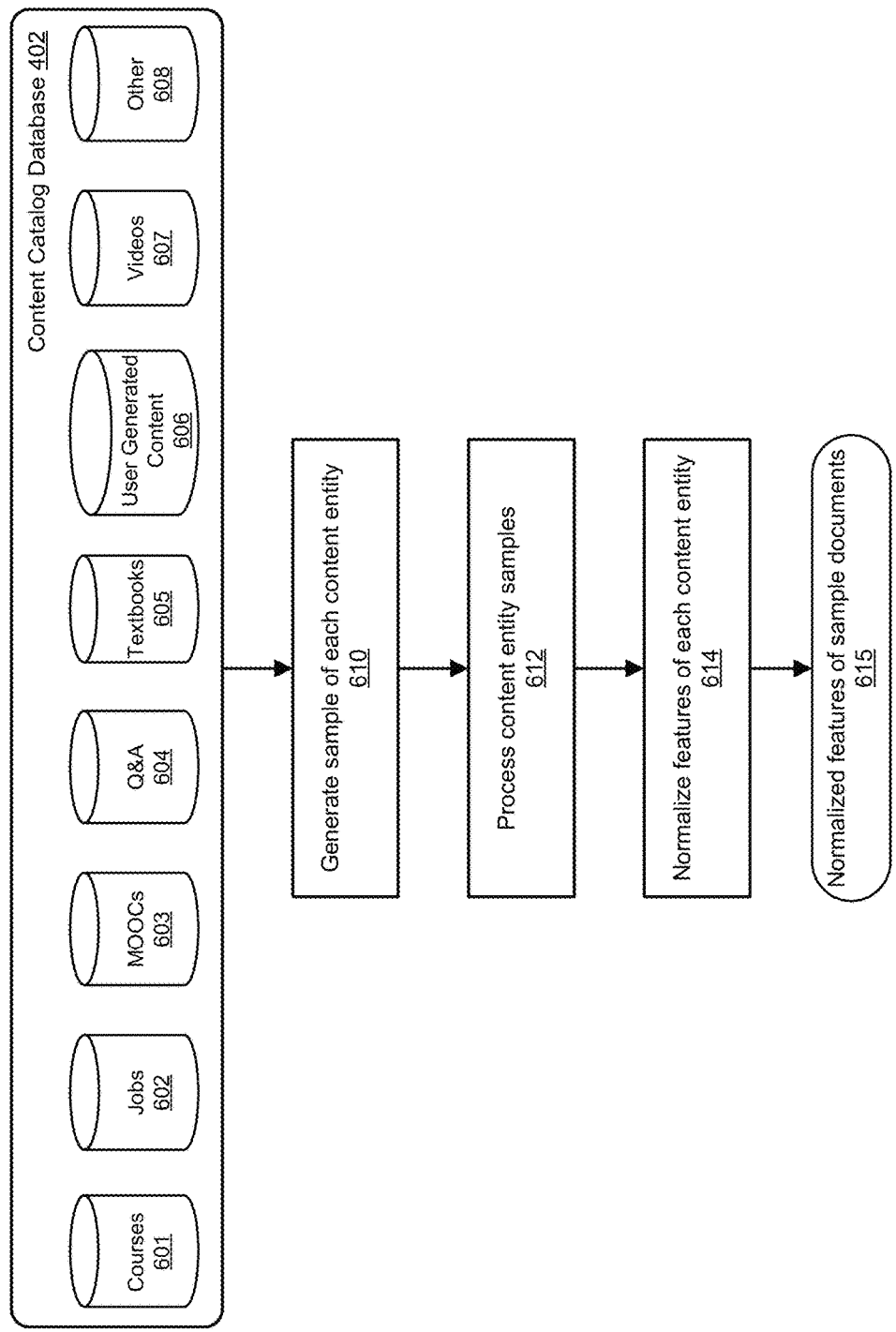
FIG. 6 is a flowchart illustrating a process for extracting document features, according to one embodiment.

FIG. 6 is a flowchart illustrating a process for extracting document features, according to one embodiment. In one embodiment, the process shown in FIG. 6 is performed by the feature extraction module 510 of the content classification system 410. Other embodiments of the process include fewer, additional, or different steps, and may perform the steps in different orders.

As shown in FIG. 6, the content catalog database 402 includes a plurality of content entities. For example, content entities in an education platform include one or more of a courses content entity 601, a jobs content entity 602, a massive online open course (MOOC) content entity, a question and answer content entity 604, a textbooks content entity 605, a user-generated content entity 606, a videos content entity 607, or other content entities 608. The content catalog database 402 may include content entities for any other type of content, including, for example, white papers, study guides, or web pages. Furthermore, there may be any number of content entities in the catalog database 402.

The feature extraction module 510 generates 610 a sample of each content entity in the content catalog database 402. Each sample includes a subset of documents belonging to a content entity. In one embodiment, each sample is a uniform random sample of each content entity.

The feature extraction module 510 processes 612 each sample by a standardized data processing scheme to clean and transform the documents. In particular, the feature extraction module 510 extracts metadata from the documents, including title, author, publication date, description, keywords, and the like. The metadata and/or the text of the documents are analyzed by one or more semantic techniques, such as term frequency-inverse document frequency normalization, part-of-speech tagging, lemmatization, latent semantic analysis, or principal component analysis, to generate feature vectors of each sample. As the documents in each content entity may be in a variety of different formats, one embodiment of the feature extraction module 510 includes a pipeline dedicated to each document format for extracting metadata and performing semantic analysis.

After extracting the feature vectors from the content entity samples, the feature extraction module 510 normalizes 614 the features across the content entities. In one embodiment, the feature extraction module 510 weights more representative features in each content entity more heavily than less representative features. The result of normalization 614 is a set of normalized features 615 of the documents in the content entity samples.

Figure 7:
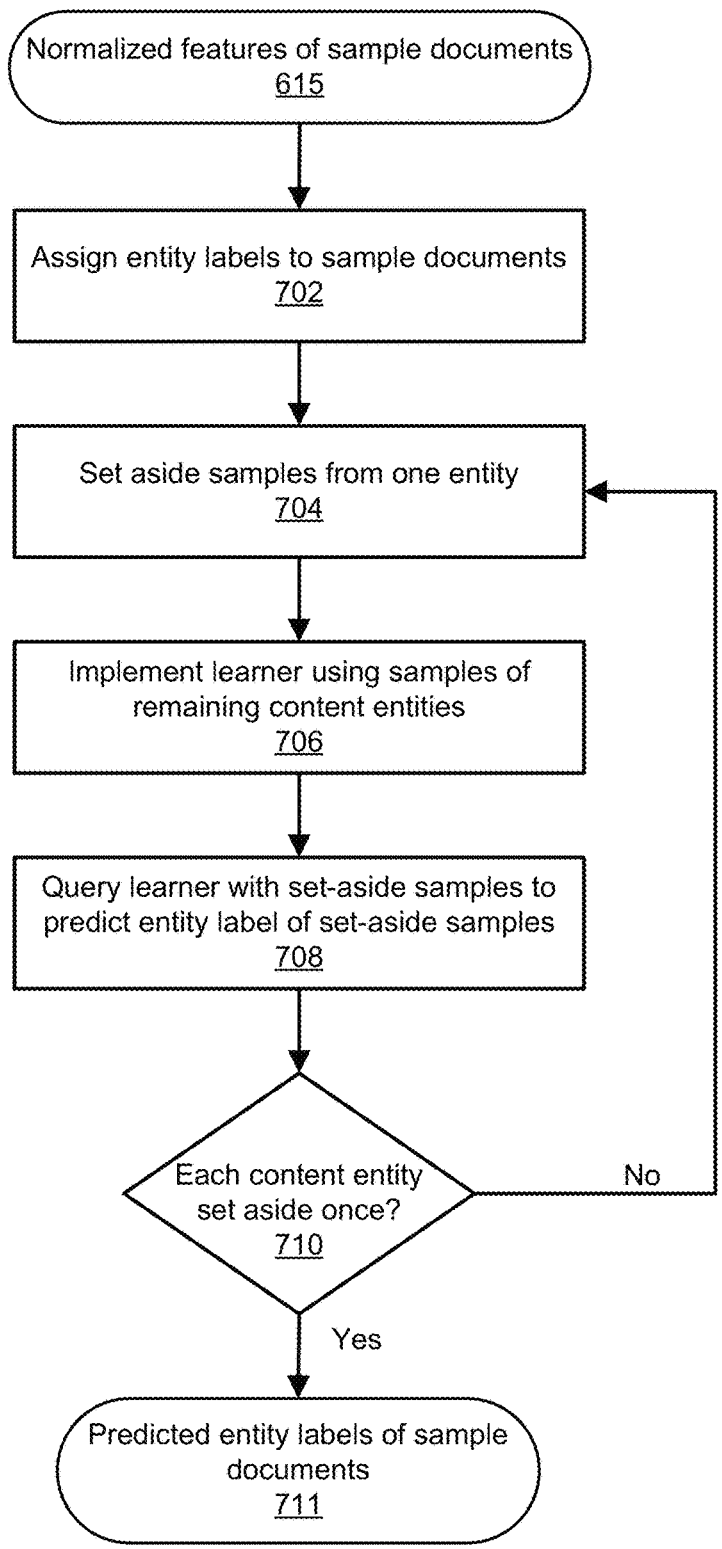
FIG. 7 is a flowchart illustrating a process for analyzing relationships between content entities, according to one embodiment.

FIG. 7 is a flowchart illustrating a method for analyzing relationships between content entities, according to one embodiment. In one embodiment, the process shown in FIG. 7 is performed by the entity relationship analysis module 520 of the content classification system 410. Other embodiments of the process include fewer, additional, or different steps, and may perform the steps in different orders.

The entity relationship analysis module 520 receives the content entity samples and the normalized features 615 extracted from the samples by the feature extraction module 510. The entity relationship analysis module 520 assigns 702 entity labels to the documents according to their respective content entity. For example, textbooks are labeled as belonging to the textbook content entity 605, video transcripts are labeled as belonging to the videos content entity 607, and so forth.

The entity relationship analysis module 520 sets aside 704 samples from one content entity, and implements 706 a learner using samples of the remaining content entities. In one embodiment, the learner implemented by the entity relationship analysis module 520 is an instance-based learner and each document is a training example for the document's content entity. For example, the entity relationship analysis module 520 generates a k-nearest neighbor classifier based on the entity labels of the samples.

The entity relationship analysis module 520 queries 706 the learner with the features of the set-aside samples to predict an entity label for each. For example, if the learner is a k-nearest neighbor classifier, the learner assigns each set-aside sample an entity label based on the similarity between features of the sample and features of the other content entities.

The entity relationship analysis module 520 repeats steps 704 through 708 for each content entity. That is, the entity relationship analysis module 520 determines 710 whether samples of each content entity have been set aside once. If not, the process returns to step 704 and the entity relationship analysis module 520 sets aside samples from another content entity. Once samples from all content entities have been set aside and entity labels predicted for the samples, the entity relationship analysis module 520 outputs the predicted entity labels 711 for each sample document.

Figure 8:
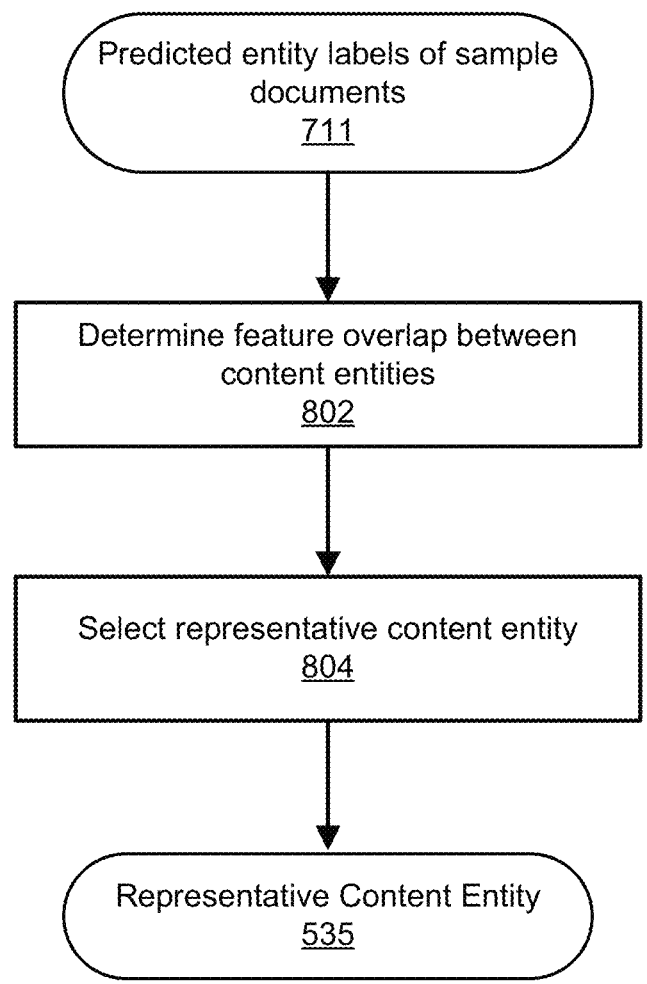
FIG. 8 is a flowchart illustrating a process for selecting a representative content entity, according to one embodiment.

FIG. 8 is a flowchart illustrating a process for selecting a representative content entity, according to one embodiment. In one embodiment, the process shown in FIG. 8 is performed by the representative content entity selection module 530 of the content classification system 410. Other embodiments of the process include fewer, additional, or different steps, and may perform the steps in different orders.

The representative content entity selection module 530 uses the predicted entity labels 711 to determine 802 a feature overlap between the content entities in the content catalog database 402. The representative content entity selection module 530 may use one of several frequency-based statistical techniques to determine 802 the feature overlap. One embodiment of the representative content entity selection module 530 determines an overlap coefficient between pairs of the content entities. To determine the overlap coefficient, the representative content entity selection module 530 builds a density plot of the predicted labels assigned to each sample document in the pair and determines an overlapping area under the curves. In another embodiment, the representative content entity selection module 530 determines a Kullback-Leibler (KL) divergence between pairs of the content entities.

Yet another embodiment of the representative content entity selection module 530 uses a confusion matrix to determine 802 the feature overlap between content entities. An example confusion matrix between a textbook content entity, a courses content entity, and a question and answer content entity is illustrated in FIG. 9. In the example of FIG. 9, 60 documents from each content entity were analyzed by the process shown in FIG. 7 to predict entity labels of the documents. Out of the 60 textbooks, 40 were labeled as courses and 20 were labeled as Q&A. Out of the 60 course documents, 50 were predicted to belong to the textbooks content entity and 10 were predicted to belong to the Q&A content entity. Lastly, out of the 60 Q&A documents, 40 were predicted to belong to the textbooks content entity and 20 were predicted to belong to the courses content entity. Thus, a total of 90 sample documents were predicted to be textbooks, 60 were predicted to be courses, and 30 were predicted to be Q&A.

Based on the determined feature overlap, the representative content entity selection module 530 selects 804 the representative content entity 535. In one embodiment, the representative content entity 535 is a content entity having a high feature overlap with each of the other content entities. For example, if the representative content entity selection module 530 determines an overlap coefficient between pairs of the content entities, the representative content entity selection module 530 selects the content entity having a high overlap coefficient with each of the other content entities as the representative content entity. If the representative content entity selection module 530 used a KL divergence to determine the feature overlap between entities, the content entity having a small divergence from each of the other content entities is selected as the representative content entity. Finally, if the representative content entity selection module 530 used a confusion matrix to determine the feature overlap, the content entity with a high column summation in the confusion matrix is selected as the representative content entity. Thus, in the example of FIG. 9, the textbook content entity may be selected as the representative content entity because the textbook column summation is higher than the columns of the other content entities. A high feature overlap between the representative content entity and the other content entities indicates that a majority of features of the other content entities are similar to features of the representative content entity. Likewise, few features of the other content entities are dissimilar to at least one feature of the representative content entities. Accordingly, a high feature overlap indicates that the representative content entity largely spans the feature space covered by the content entities of the content catalog database 402.

Classifying Documents

Figure 10:
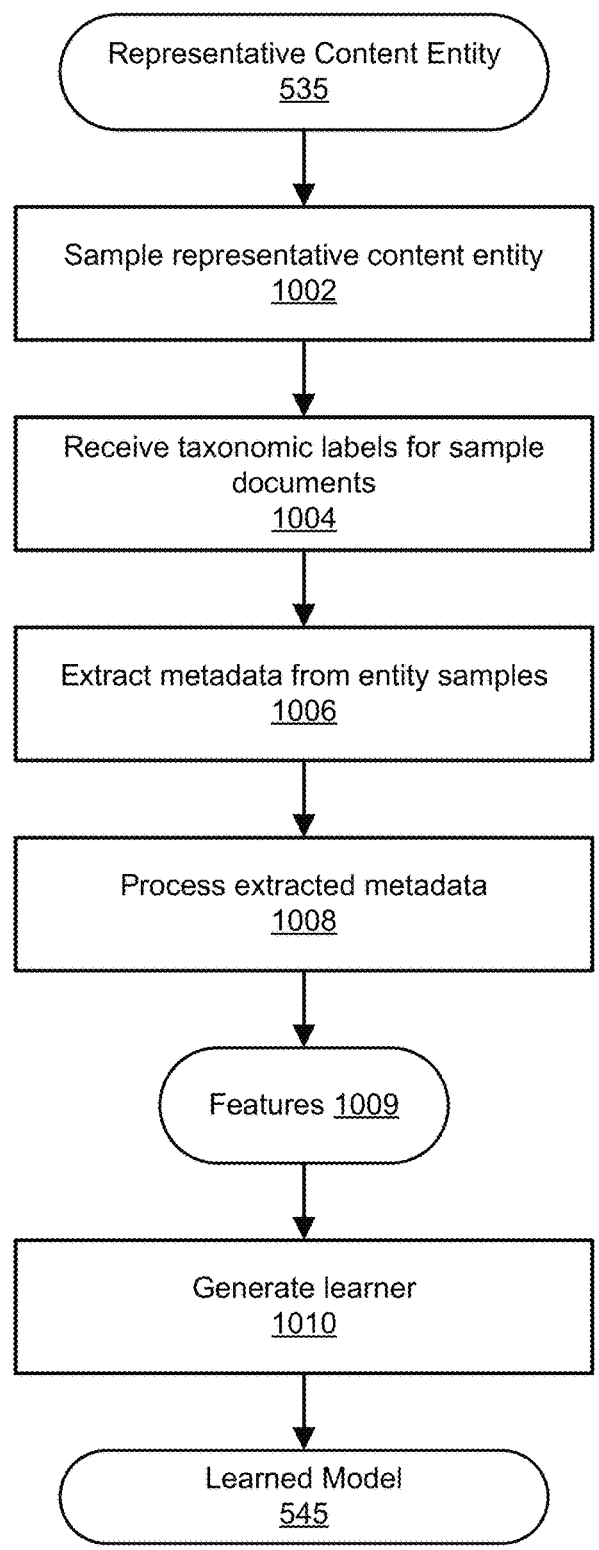
FIG. 10 is a flowchart illustrating a process for generating a learned model for assigning taxonomic labels to a representative content entity, according to one embodiment.

The content classification system 410 uses features of the representative content entity 535 to generate a learned model. FIG. 10 is a flowchart illustrating a process for generating the learned model for the representative content entity, according to one embodiment. In one embodiment, the process shown in FIG. 10 is performed by the model trainer 540 of the content classification system 410. Other embodiments of the process include fewer, additional, or different steps, and may perform the steps in different orders.

The model trainer 540 samples 1002 the representative content entity 535 to select a set of documents for a training set. In one embodiment, the sample generated by the model trainer 540 is a uniform random sample of the representative content entity 535.

The model trainer 540 receives 1004 taxonomic labels for the sample documents. In one embodiment, the taxonomic labels are applied to the sample documents by subject matter experts, who evaluate the sample documents and assign one or more taxonomic labels to each document to indicate subject matter of the document. For example, the subject matter experts may assign a category label and a subject label to each sample document.

Another embodiment of the model trainer 540 receives a set of documents of the representative content entity 535 that have been tagged with taxonomic labels, and uses the received documents as samples of the representative content entity.

The model trainer 540 extracts 1006 metadata from the entity samples, such as title, author, description, and keywords. The model trainer 540 processes 1008 the extracted metadata to generate a set of features 1009 for each sample documents. In one embodiment, the model trainer 540 processes 1008 the extracted metadata by one or more semantic analysis techniques, such as n-gram models, term frequency-inverse document frequency, part-of-speech tagging, custom stopword removal, custom synonym analysis, lemmatization, latent semantic analysis, or principal component analysis.

The model trainer 540 uses the extracted features 1009 to generate 1010 a learner for applying taxonomic labels to documents of the representative content entity. The model trainer 540 receives the taxonomic labels applied to the sample documents and the features 1009 of the sample documents, and generates the model. In one embodiment, the model trainer 540 generates the model using an ensemble method, such as linear support vector classification, logistic regression, k-nearest neighbor, naïve Bayes, or stochastic gradient descent. The model trainer 540 outputs the learned model 545 to the classification module 550 for classifying documents of the other content entities.

Figure 11:
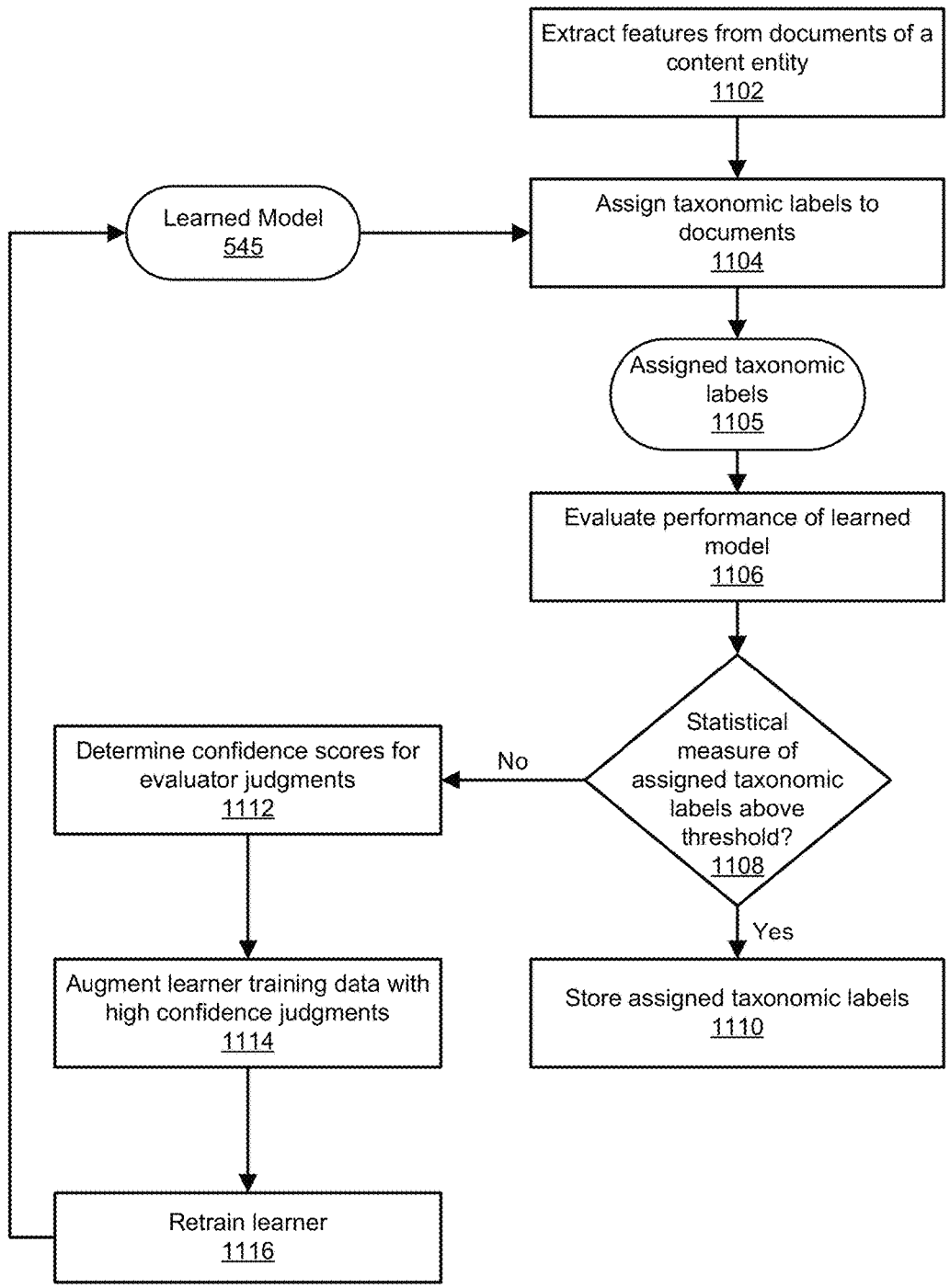
FIG. 11 is a flowchart illustrating a process for assigning taxonomic labels to documents using the learned model, according to one embodiment.

FIG. 11 is a flowchart illustrating a method for assigning taxonomic labels to documents using the learned model 545, according to one embodiment. In one embodiment, the process shown in FIG. 11 is performed by the classification module 550 of the content classification system 410. The classification module 550 performs the process shown in FIG. 11 for each content entity of the content catalog database 402. Other embodiments of the process include fewer, additional, or different steps, and may perform the steps in different orders.

The classification module 550 extracts 402 features from documents of a content entity in the content catalog database 402. To extract 402 the features, the classification module 550 may perform similar techniques as the model trainer 540, including metadata extraction and semantic analysis.

The classification module 550 applies the learned model 545 to the extracted features to assign 1104 taxonomic labels to the documents, generating a set of assigned taxonomic labels 1105 for each document in the content entity under evaluation. In one embodiment, the classification module 540 applies at least a category label and a subject label to each document, though labels for additional levels in the taxonomic hierarchy may also be applied to the documents. Moreover, multiple category and subject labels may be assigned to a single document.

The classification module 550 evaluates 1106 the performance of the learned model 545 in applying taxonomic labels to the documents of the content entity under evaluation. In one embodiment, the classification module 550 receives human judgments of appropriate taxonomic labels to be applied to a subset of the documents of the evaluated content entity (e.g., a random sample of the evaluated content entity's documents). The classification module 550 generates a user interface for display to the evaluators that provides a validation task for each of a subset of documents. Example validation tasks include approving or rejecting the labels assigned by the learned model 545 or rating the labels on a scale (e.g., on a scale from one to five). Other validation tasks requests evaluators to manually select taxonomic labels to be applied to the documents of the subset, for example by entering free-form text or selecting the labels from a list. Based on the validation tasks performed by the evaluators, the classification module 550 generates one or more statistical measures of the performance of the learned model 545. These statistical measures may include, for example, an F1 score, area under the receiver operator curve, precision, sensitivity, accuracy, or negative prediction value.

The classification module 550 determines 1108 whether the statistical measures of the model's performance are above corresponding thresholds. If so, the classification module 550 stores 110 the taxonomic labels assigned to the documents of the evaluated content entity by the learned model 545. The classification module 550 may then repeat the process shown in FIG. 11 for another content entity, if any content entities remain to be evaluated.

If the performance of the learned model 545 does not meet statistical thresholds, the classification module 550 determines 1112 confidence scores for the evaluator judgments. For example, the classification module 550 scores each judgment based on a number of judgments per document, a number of evaluators who agreed on the same judgment, a quality rating of each evaluator, or other factors.

The classification module 550 uses the evaluator judgments to augment 1114 the training data for the learned model 545. The classification module 550 selects evaluator judgments having a high confidence score and adds the corresponding documents and assigned taxonomic labels to the training set for the learned model 545. The classification module 550 retrains 1116 the learned model 545 using the augmented training set. The retrained model is applied to the features extracted from documents of the content entity under evaluation to assign 1104 taxonomic labels to the documents.

The process shown in FIG. 11 is repeated until taxonomic labels are stored for documents of each of the content entities in the content catalog database 402. Similarly, when a new content entity is added to the catalog database 402, the classification module 550 assigns taxonomic labels to the documents of the new content entity by the process shown in FIG. 11. Accordingly, the classification module 550 classifies the documents of the new content entity using the model trained for the representative content entity, rather than training a new model for the entity.

By assigning taxonomic labels to documents of multiple content entities, the content classification system 410 provides a classification of the documents. When classifying educational documents, for example, the content classification system 410 classifies the documents into a hierarchical discipline structure of content categories and subjects within each category based on the taxonomic labels assigned to the documents.

Figure 12:
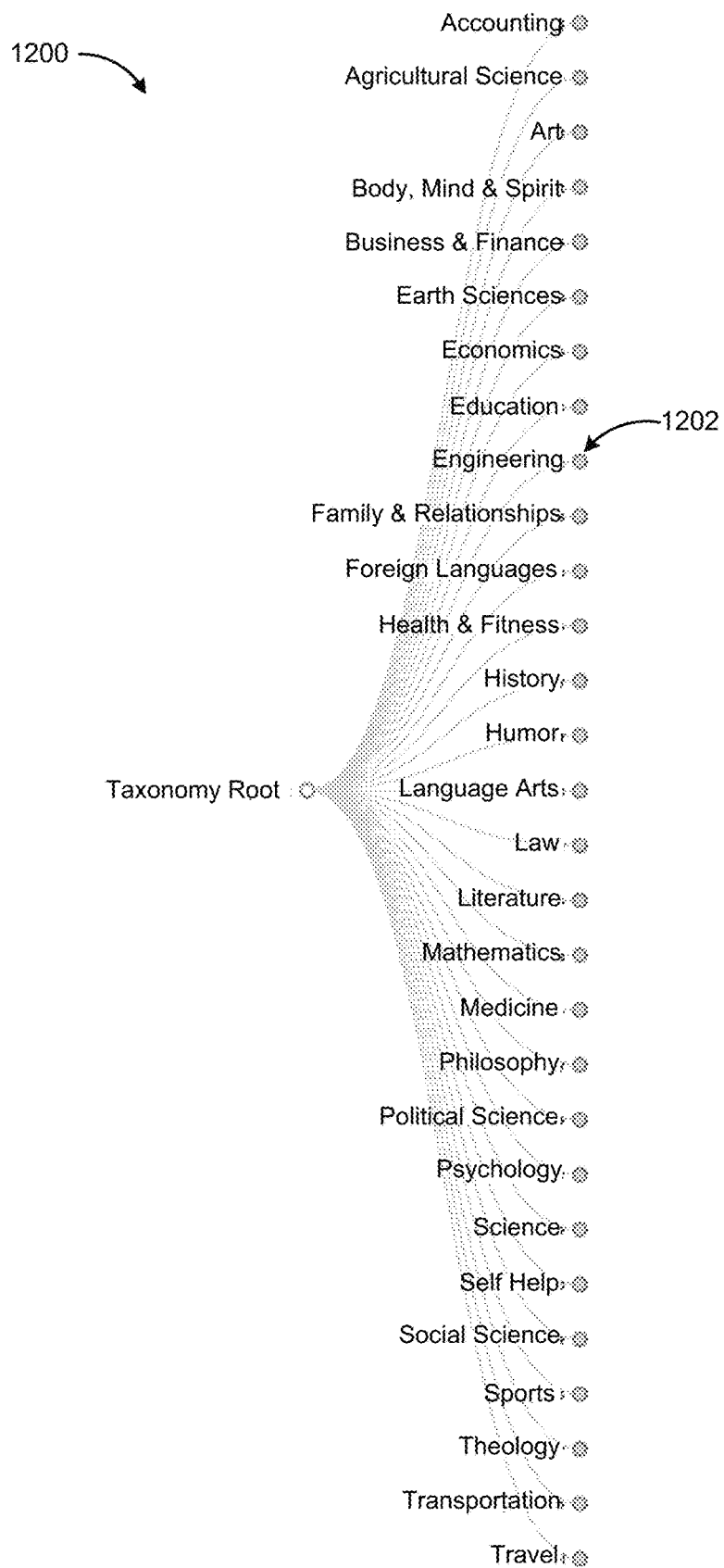
FIG. 12 illustrates an example visualization of a hierarchical discipline structure, according to one embodiment.
Figure 13:
FIG. 13 illustrates another example visualization of a hierarchical discipline structure, according to one embodiment.
Figure 14:
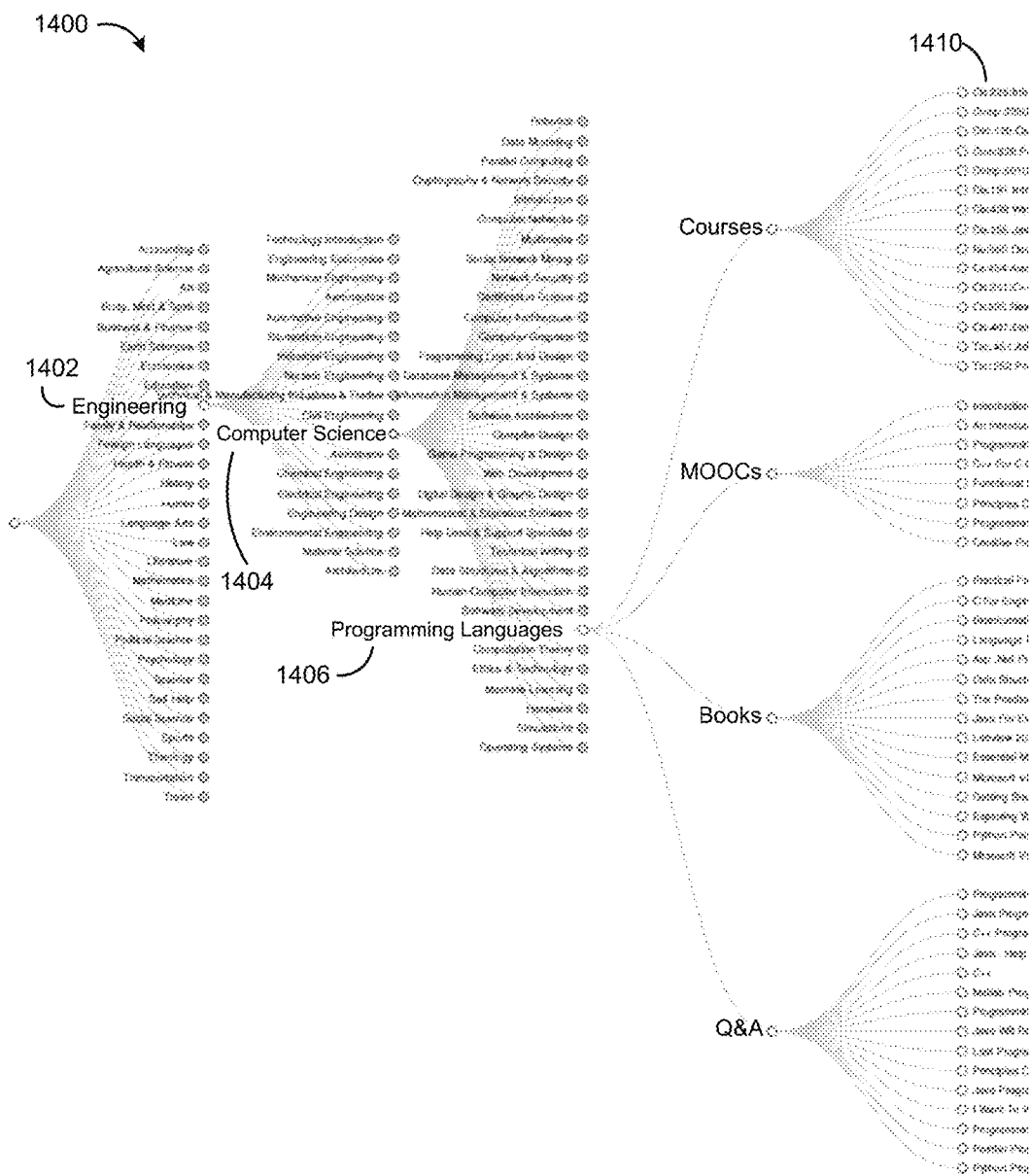
FIG. 14 illustrates yet another example visualization of a hierarchical discipline structure, according to one embodiment.

FIGS. 12-14 illustrate example visualizations of the hierarchical discipline structure generated by the content classification system 410. The example visualizations may be displayed to a user of the education platform 400. For example, a user interacts with the visualizations to browse content of the education platform 400. FIG. 12 illustrates a first level 1200 of the hierarchy, including a number of content categories 1202. FIG. 13 illustrates an example visualization 1300 in which three categories of the visualization 1200 have been expanded to display a number of subjects 1302 within the categories. For example, a user can expand each of the categories in the visualization 1200 to view subjects within the category in the taxonomic hierarchy.

FIG. 14 illustrates an example visualization 1400 of documents 1410 classified into a three-tier taxonomic hierarchy. Each of the documents in the example of FIG. 14 has been labeled with an "engineering" category label 1402, a "computer science" subject label 1404, and a "programming languages" sub-subject label 1406. Using the visualization 1400 shown in FIG. 14, the user can browse documents in the selected category, subject, and sub-subject, whether the documents belong to a course content entity, a MOOCs content entity, a books content entity, or a question and answer content entity. Other content entities may also be included in the visualization 1400. Furthermore, the hierarchical discipline structure may include fewer or additional levels than a category, subject, and sub-subject.

Topic Extraction

Figure 15:
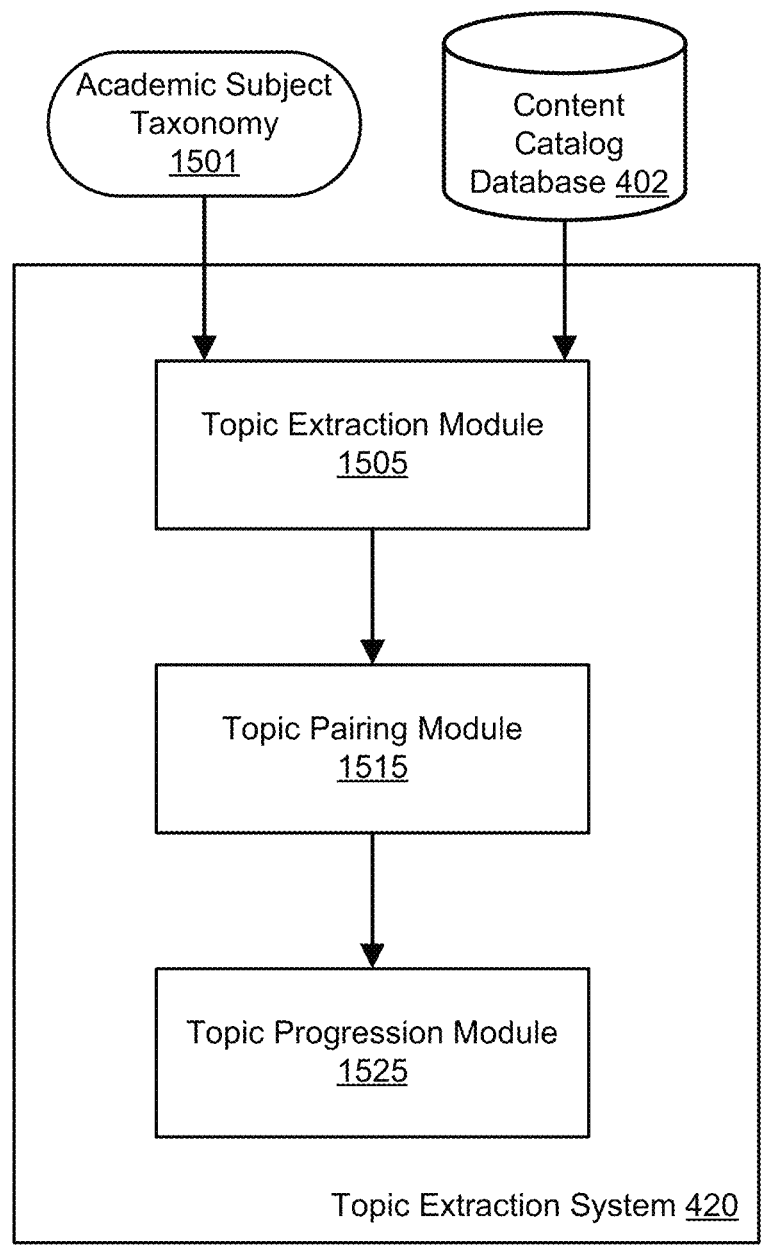
FIG. 15 is a block diagram illustrating modules within a topic extraction system, according to one embodiment.

FIG. 15 is a block diagram illustrating modules within the topic extraction system 420, according to one embodiment. In one embodiment, the topic extraction system 420 executes a topic extraction module 1505, a topic pairing module 1515, and a topic progression module 1525. Other embodiments of the topic extraction system 420 may include fewer, additional, or different modules, and the functionality may be distributed differently among the modules.

The topic extraction module 1505 analyzes documents in the content catalog database 402 to identify topics addressed in the documents. The topic extraction module 1505 identifies topics based on an analysis of tokens extracted from the documents. In one embodiment, the topic extraction module 1505 identifies topics in a document by determining an affinity of tokens extracted from the document to the taxonomic branch of the document. Using the extracted topics and the affinities of the topics to respective taxonomic branches, the topic extraction module 1505 generates a topic graph. A process performed by the topic extraction module 1505 to generate a topic graph is described with respect to FIG. 16.

The topic pairing module 1515 identifies associations between topics extracted by the topic extraction module 1505. Using the identified associations, the topic pairing module 1515 generates topic pairs. Each topic pair represents a relationship between topics. In one embodiment, the topic pairing module 1515 identifies associations based on a determination that two topics frequently discussed in proximity to one another in educational documents are likely to be related. Accordingly, in one embodiment, the topic pairing module 1515 identifies topic associations between topics appearing in proximity to one another in educational documents. A process performed by the topic pairing module 1515 to pair topics is described with respect to FIG. 18.

The topic progression module 1525 uses the topic pairs generated by the topic pairing module 1515 to generate one or more progressions of the topics extracted by the topic extraction module 1505. For a topic extracted by the topic extraction module 1505, the topic progression module 1525 determines a complexity of the topic by analyzing complexity of the documents from which the topic was extracted and the location of the topic in the documents. The topic progression module 1525 uses the topic complexities to generate the progressions, which are sequences of related topics ordered according to the complexity of the topics.

Figure 16:
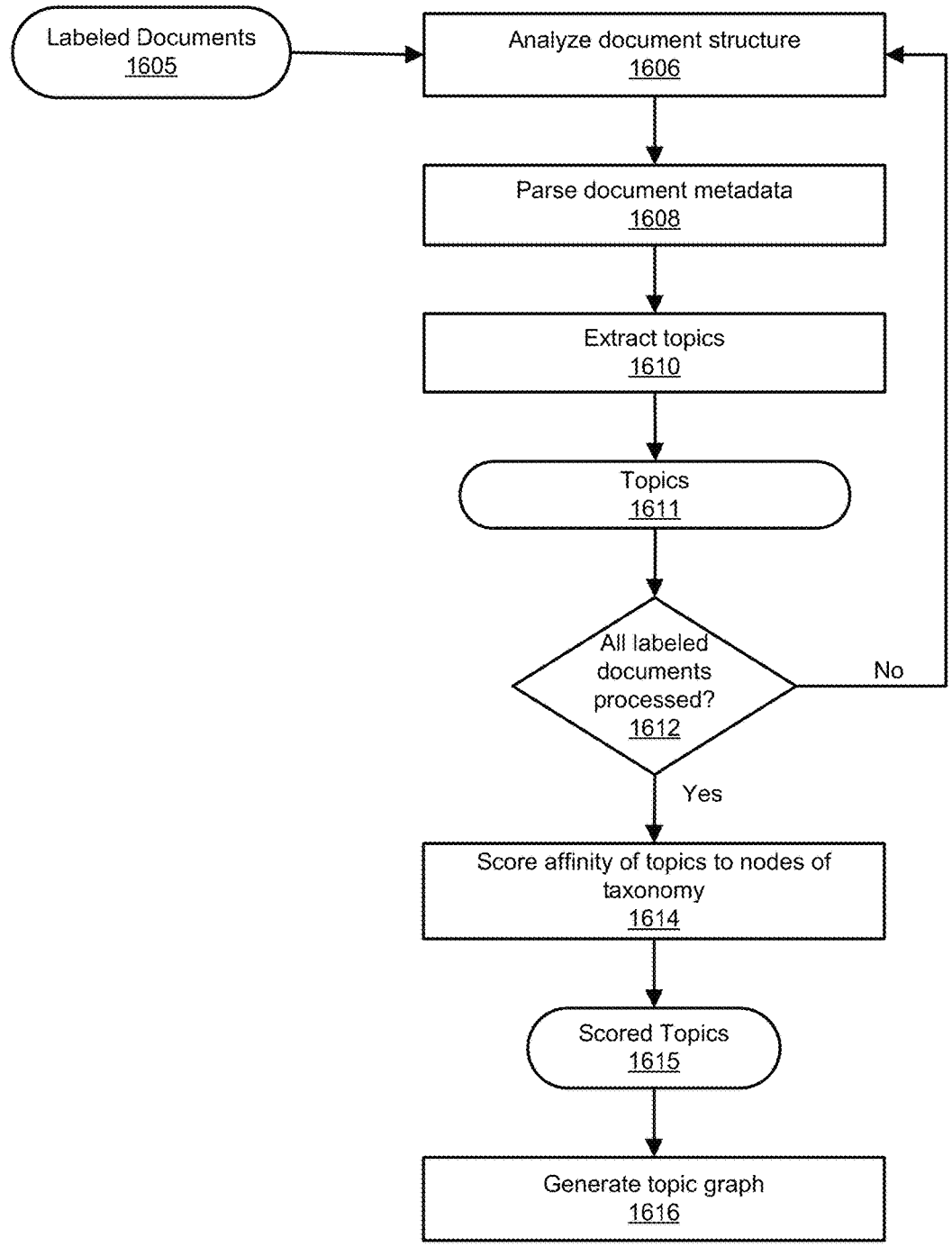
FIG. 16 is a flowchart illustrating a process for generating a topic graph, according to one embodiment.

FIG. 16 is a flowchart illustrating a process for generating a topic graph for documents in the content catalog database 402. In one embodiment, the steps of the process shown in FIG. 16 are performed by the topic extraction module 1505. Other embodiments of the process include fewer, additional, or different steps, and may perform the steps in different orders. The topic extraction module 1505 performs the process shown in FIG. 16 for each document in a set of documents 1605 tagged with taxonomic labels. For example, the topic extraction module 1505 performs the process for a plurality of documents tagged by the content classification system 410. In one embodiment, the document set 1605 is a set of documents from the representative content entity.

For each of the labeled documents 1605, the topic extraction module 1505 analyzes 1606 a structure of the document, such as a title of the document, a table of contents, section headings, and/or an index of the document. In one embodiment, the topic extraction module 1505 performs a process similar to the process performed by the publishing system 130 to analyze a table of contents of the document, as described with respect to FIG. 3. Alternatively, the topic extraction module 1505 uses the table of contents output by the publishing system 130.

The topic extraction module 1505 parses 1608 metadata of the document to generate a map identifying locations of content in the document relative to the document structure. In one embodiment, the topic extraction module 1505 generates a map identifying page numbers of the terms in the document, as well as sections of the documents corresponding to the page numbers. For example, the topic extraction module 1505 generates a map identifying each page of the document on which a term appears and each chapter or sub-chapter in which the term appears.

The topic extraction module 1505 extracts 1610 topics from the document and indexes the topics into the structure of the document using the parsed metadata. A topic is a phrase of one or more terms extracted from the document. To extract a topic, the topic extraction module 1505 tokenizes text of the document into n-gram tokens and identifies tokens likely to be topics of the document. In one embodiment, the topic extraction module 1505 selects tokens including nouns or noun-adjective phrases, tokens naming recognized entities, tokens corresponding to terms appearing in a document glossary, and tokens including a capital letter for inclusion in a candidate set. Other rules may alternatively be used to select the tokens to include in the candidate set. For each n-gram token including more than one term, the topic extraction module 1505 determines associations between the terms in the token to determine whether the terms are more likely to appear together in a document or separately. The topic extraction module 1505 selects topics from the tokens in the candidate set, generating a topic set 1611 for each document in the document set 1605. The topic extraction process is described further with respect to FIG. 17.

After the set of labeled documents 1605 has been processed 1612 and topics extracted from each document, the topic extraction module 1505 scores 1614 the topics extracted from the labeled documents 1605 based on their affinity to various branches of the academic taxonomy. A branch of the taxonomy corresponds to a taxonomic label at a specified level in the hierarchy, as well as taxonomic labels at lower levels in the hierarchy. For example, a branch of the academic taxonomy corresponding to an engineering category includes mechanical engineering, biomedical engineering, computer science, and electrical engineering subjects below the engineering category in the hierarchy, as well as any sub-subjects of the subjects. As a topic may appear in documents belonging to multiple branches of the taxonomy, the topic extraction module 1505 generates affinity scores representing the topic's affinity to the taxonomic labels assigned to the documents in which the topic appears. For example, the topic "linear regression" may appear in textbooks labeled as belonging to the subjects mathematics, engineering, and science, and the topic "cognitive theory" may appear in textbooks labeled as belonging to the subjects social science, psychology, medicine, science, engineering, and philosophy.

In one embodiment, the topic extraction module 1505 scores 1614 the topics using a term frequency proportional document frequency (TFPDF) metric and a term frequency inverse document frequency (TFIDF) metric. The TFPDF metric weights topics based on their frequency within documents of the same taxonomy branch, such that a topic occurring frequently in a particular taxonomy branch receives a high TFPDF score. In one embodiment, the topic extraction module 1505 determines the TFPDF metric for each topic and each branch of the taxonomy by the following equation:

$$TFPDF_{topicTaxonomy} = F_{topicTaxonomy} * e^{\left(\frac{nDoc_{topicTaxonomy}}{N_{Taxonomy}}\right)} \quad (1)$$

in which:
$F_{topicTaxonomy}$=frequency of topic appearance in documents of a particular taxonomy branch as a proportion of the total number of documents in the branch;
$nDoc_{topicTaxonomy}$=number of unique documents in which the topic appears in a given taxonomy branch;
$N_{Taxonomy}$=total number of documents in the set of labeled documents 1605 under a given taxonomy branch.

The TFIDF metric weights topics based on their frequency across the taxonomy, such that a topic occurring frequently in multiple taxonomy branches receives a low TFIDF score. In one embodiment, the topic extraction module 1505 determines the TFIDF metric for each topic by the following equation:

$$TFIDF_{topicTaxonomy} = F_{topicTaxonomy} * \log\left(\frac{N}{nDoc_{topic}}\right) \quad (2)$$

in which:
$F_{topicTaxonomy}$=frequency of topic appearance in documents of a particular taxonomy branch as a proportion of the total number of documents in the branch;
$nDoc_{topic}$=number of unique documents in the set of labeled documents 1605 in which the topic appears;
$N$=total number of documents in the set of labeled documents 1605.

Finally, the topic extraction module 1505 generates the affinity score of a topic to a particular branch of the taxonomy based on the TFPDF metric for the topic and the taxonomy branch and the TFIDF metric for the topic. In one embodiment, the topic extraction module 1505 generates the affinity score for a topic by computing a sum of the TFPDF and TFIDF metrics for a given taxonomic label and normalizing the sum to specified range, such as the range 0-1. In this case, a topic is assigned a high affinity score to a given taxonomic label if the term appears frequently in the taxonomy branch rooted at the label and appears infrequently in other taxonomy branches. The topic extraction module 1505 may generate an affinity score between the topic and each taxonomic label assigned to documents from which the topic was extracted.

Using the scored topics 1615, the topic extraction module 1505 generates 1616 a topic graph. The topic graph represents at least a portion of the subject matter taxonomy and a plurality of topics associated with the represented portion. In one embodiment, one or more taxonomic labels are represented as nodes in the topic graph, and topics associated with the taxonomic labels are linked to each node.

Figure 17:
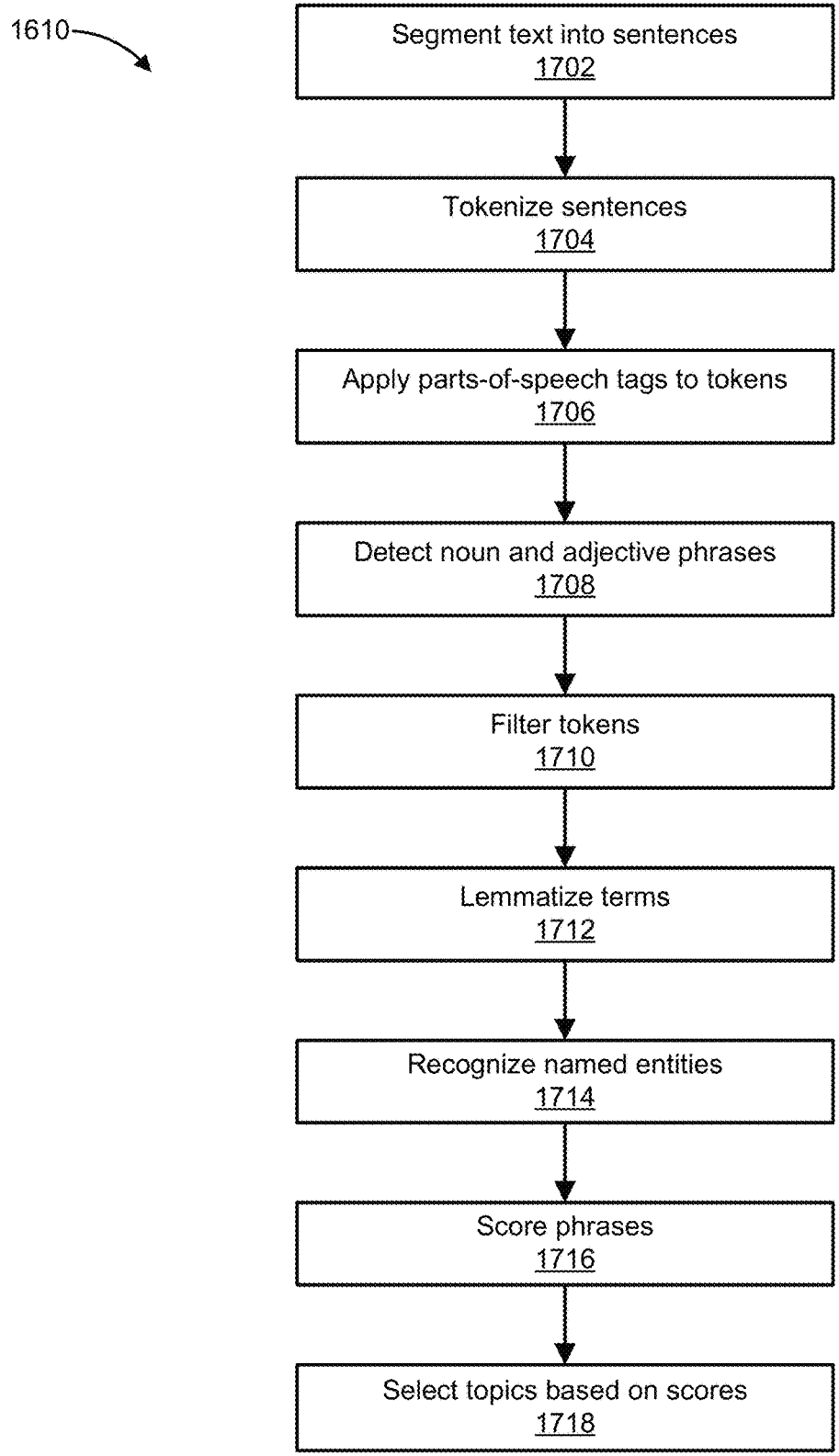
FIG. 17 is a flowchart illustrating a process for extracting topics from a document, according to one embodiment.

FIG. 17 is a flowchart illustrating details of one embodiment of a method for extracting 1610 topics from a document. Other embodiments may perform the steps of the process in different orders, and the process may include fewer, additional, or different steps.

The topic extraction module 1505 receives text of a document in the set of labeled documents 1605. The topic extraction module 1505 segments 1702 the text on each page of the document into sentences and tokenizes 1704 the sentences into a list of n-gram tokens. In one embodiment, the topic extraction module 1505 tokenizes 1704 the sentences into unigrams, bigrams, and trigrams.

The topic extraction module 1505 applies 1706 part-of-speech tags to the tokens. Using the part-of-speech tags, the topic extraction module 1505 detects 1708 noun and adjective phrases and flags the corresponding n-gram tokens. The topic extraction module 1505 also filters 1710 the tokens based on the parts-of-speech tags, removing punctuation, conjunctions, pronouns, interjections, and prepositions. In other embodiments, the topic extraction module 1505 may filter out tokens of different parts of speech.

For the tokens not discarded during the filtering, the topic extraction module 1505 lemmatizes 1712 each token, converting plural nouns to singular and conjugated verbs to their root forms. The topic extraction module 1505 also performs named entity recognition 1714, flagging tokens naming locations, people, and organizations. The tokens naming recognized entities are added to a consideration set. The topic extraction module 1505 may use any of a variety of other heuristics to select tokens for the consideration set or filter out tokens. For example, one embodiment of the topic extraction module 1505 selects tokens beginning with capital letters for inclusion in the consideration set. In another embodiment, the topic extraction module 1505 selects tokens corresponding to terms in a glossary of the document for inclusion in the consideration set.

In one embodiment, the unigram tokens in the consideration set are selected as topics of the document set 1605. For tokens comprising two or more terms (e.g., bigrams and trigrams), the topic extraction module 1505 generates 1716 a score for the tokens in the consideration set representing associations between the terms in each token. In one embodiment, the topic extraction module 1505 scores 1716 the n-gram tokens using a pointwise mutual information (PMI) score. PMI quantifies the coincidental probability of the terms in each token appearing together given the joint probability distribution of the terms and the individual probability distributions of the terms in each token. For example, the topic extraction module 1505 generates the PMI score of a trigram token by the following equation:

$$PMI = \log\left(\frac{P(x, y, z)}{P(x) * P(y) * P(z)}\right) \quad (3)$$

in which $P(x, y, z)$ is the joint probability of terms x, y, and z; $P(x)$ is the probability of term x; $P(y)$ is the probability of term y; and $P(z)$ is the probability of term z.

A high PMI score indicates a greater association between terms in a token than a lower PMI score. For example, a high PMI score assigned to a trigram token indicates that the terms in the trigram frequently appear together in a document. A low PMI score assigned to a trigram token indicates that the terms in the trigram rarely appear together in a document.

Based on the PMI scores assigned to the tokens, the topic extraction module 1505 selects 1718 tokens and identifies the selected tokens as topics in the document set 1605. In one embodiment, the topic extraction module 1505 selects 1718 tokens having PMI scores greater than a threshold.

Topic Pairing

Figure 18:
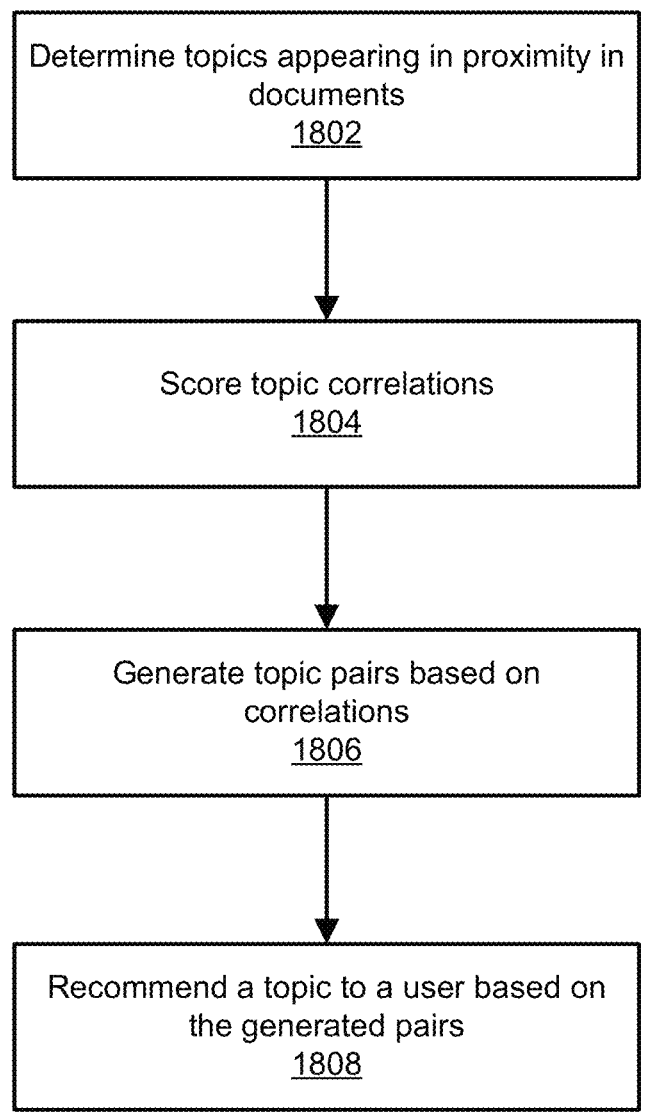
FIG. 18 is a flowchart illustrating a process for pairing topics, according to one embodiment.

FIG. 18 is a flowchart illustrating one embodiment of a process for pairing topics. In one embodiment, the process is performed by the topic pairing module 1515 of the topic extraction system 420. Other embodiments may include fewer, additional, or different steps, and may perform the steps in different orders.

The topic pairing module 1515 determines 1802 topics appearing in proximity to one another in documents of the content catalog 402, such as topics appearing on the same page or topics appearing in the same section of the documents. In one embodiment, the topic pairing module 1515 applies an Apriori algorithm to identify topics appearing in proximity to one another across multiple documents belonging to the same taxonomy branch. Other algorithms identifying associations between topics in the documents of the content catalog 402 may alternatively be used.

The topic pairing module 1515 scores 1804 the topics identified as being in proximity to one another to quantify the degree of correlation between the topics. In one embodiment, the topic pairing module 1515 scores the topics using one or more interestingness measures for each pair of topics, such as support, confidence, lift, and conviction. The support supp(x) for a topic x is given by the probability $P(x)$ of the topic occurring in a given document. The confidence conf $(x \rightarrow y)$ for a topic y occurring in a document given the occurrence of topic x in the document is defined by the conditional probability of y given x, or $P(x \text{ and } y)/P(x)$. The lift lift$(x \rightarrow y)$ for a topic y occurring in a document given the occurrence of topic x is given by the observed support for x and y in the document as a ratio of the expected support if x and y were independent topics, or $P(x \text{ and } y)/[P(x)P(y)]$. The conviction conv$(x \rightarrow y)$ is given by a ratio of the expected frequency of topic x occurring in a document without topic y (assuming x and y are independent topics) to the observed frequency of x without y, or $P(x)P(\text{not } y)/P(x \text{ and not } y)$.

Using the topic correlations and the scores, the topic pairing module 1515 generates 1806 topic pairs. The topic pairing module 1515 pairs two topics if the pairing between the topics has interestingness measures above a specified threshold. For example, two topics A and B are paired if lift$(A \rightarrow B)$ and conv$(A \rightarrow B)$ are above corresponding thresholds.

By pairing topics related to one another in a particular taxonomy branch, the topic pairing module 1515 generates associations between topics in a particular taxonomic branch and across multiple taxonomic branches that enable users of the education platform 400 to navigate learning materials provided by the platform. In one embodiment, the topic pairing module 1515 uses the topic pairs to recommend 1808 a topic to a user. For example, after a user studies a first topic, the topic pairing module 1515 recommends 1808 to the user a second topic that is paired to the first topic.

Example Topic Graph

Figure 19:
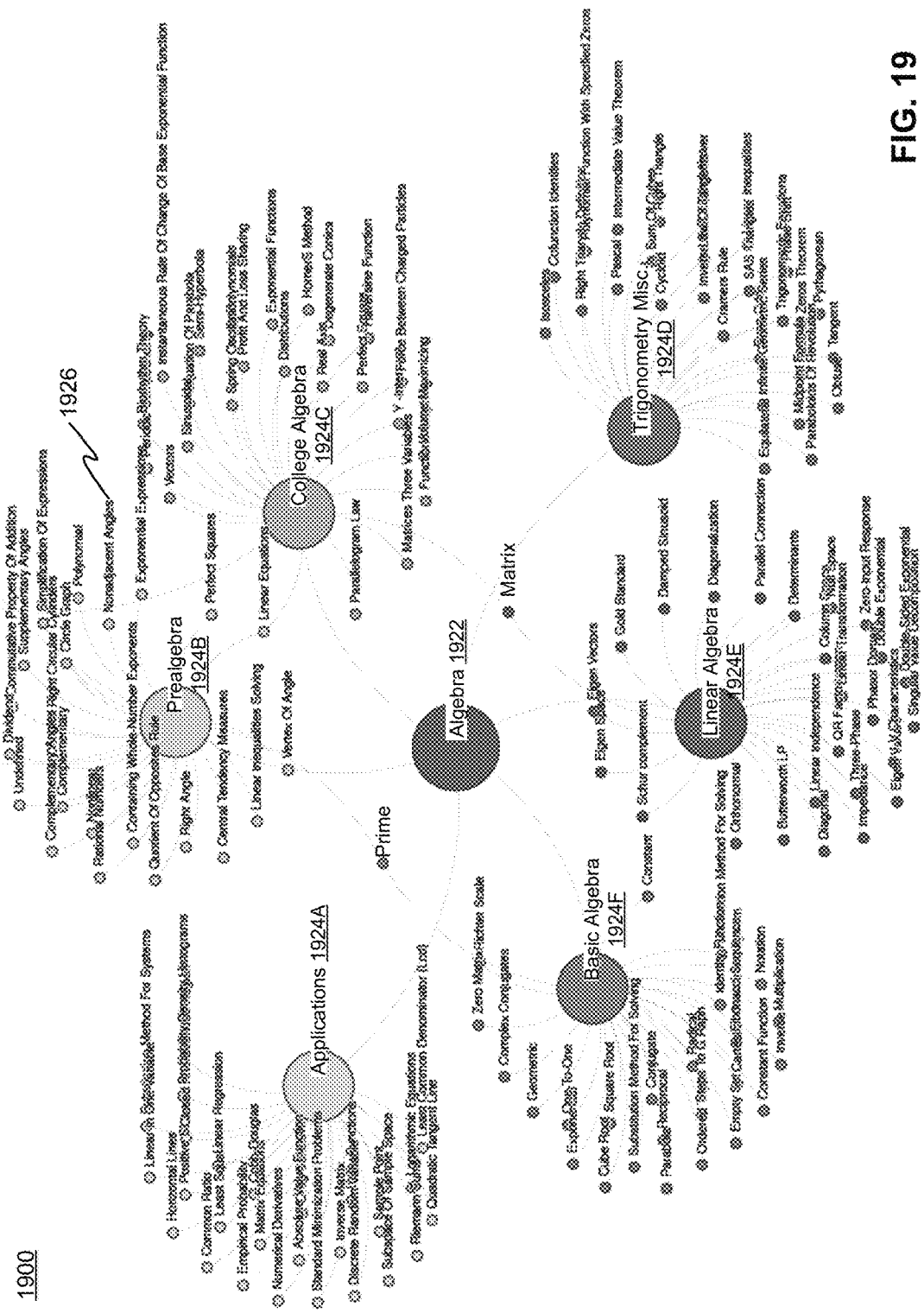
FIG. 19 illustrates an example topic graph, according to one embodiment.

As described above, one embodiment of the topic extraction system 420 generates a topic graph for display to users of the education platform 400. FIG. 19 illustrates an example topic graph 1900 showing topics associated with various sub-subjects of a subject matter taxonomy. The topic graph 1900 may be displayed to users of the education platform 400 via the user devices 430, and enables the users to browse content of the content catalog database 402 according to topics. The topic graph 1900 illustrates various nodes of the subject matter taxonomy, including sub-subjects 1924 within the "algebra" subject 1922, as well as topics 1926 associated with each sub-subject 1924. As shown in FIG. 19, some topics may be associated with multiple branches of the subject matter taxonomy. For example, the topic "matrix" is associated with the sub-subject "linear algebra" 1924E as well as the sub-subject "college algebra" 1924C. A user may interact with the topic graph 1900 to browse content of the content catalog database 402. For example, if a user selects one of the topics 1926, identifiers of documents including the topic may be displayed to the user. Alternatively, as the locations of the topics in the documents are known, the portions of the documents including the selected topic may be displayed to the user. For example, identifiers of the sections of the documents including a topic are provided to the user in response to the user's selection of a topic.

The topic graph 1900 shown in FIG. 19 provides a user with an intuitive tool for navigating content of the content catalog database 402. By interacting with the topic graph, the user can browse subjects or topics of interest and identify documents describing the topics. In one embodiment, the topic extraction system 420 displays identifiers of documents from which a topic was extracted in response to receiving a user's selection of the topic. Thus, for example, rather than browsing documents and determining whether the documents discuss a particular topic, the user can navigate directly to the topic via the topic graph (e.g., by selecting it from a display of the topic graph) and view a list of the documents describing the topic. Moreover, as the topic graph displays a plurality of topics within one or more branches of the subject matter taxonomy, the topic graph provides a user with information about relationships between topics. For example, as the topic graph 1900 shown in FIG. 19 illustrates topics within several sub-subjects 1924, a user viewing the topic graph 1900 can identify closely related topics (e.g., topics within the same sub-subject) as well as understand relationships of the topics to the algebra subject 1922.

Generating a Topic Progression

Figure 20:
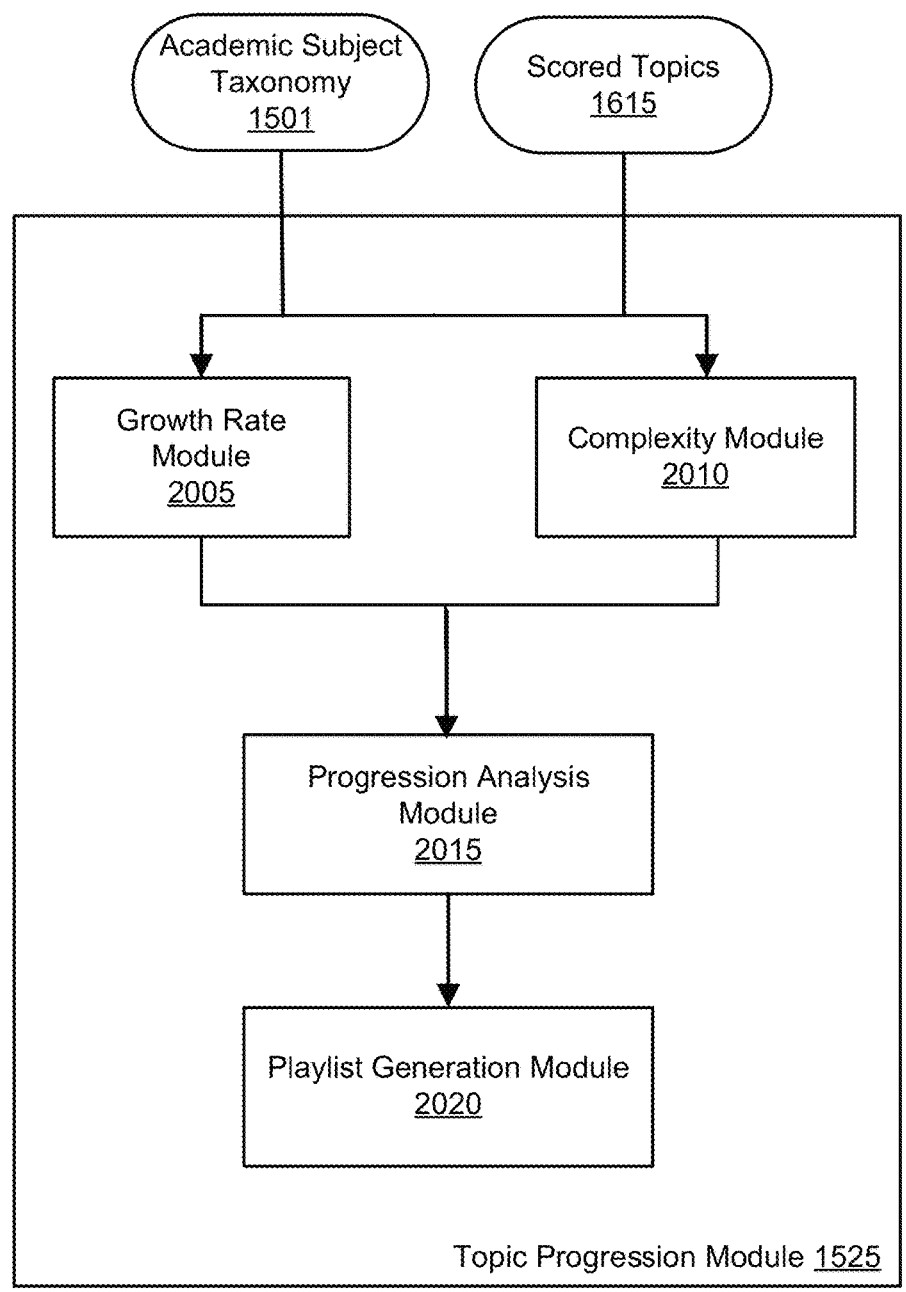
FIG. 20 is a block diagram illustrating modules within a topic progression module, according to one embodiment.

FIG. 20 is a block diagram illustrating modules within the topic progression module 1525. In one embodiment, the topic progression module 1525 includes a growth rate module 2005, a complexity module 2010, a progression analysis module 2015, and a playlist generation module 2020. Other embodiments of the topic progression module 1525 may include fewer, different, or additional modules, and the functionality may be distributed differently between the modules.

The growth rate module 2005 determines growth rates of topics, or a rate at which the topic is mentioned in documents in the content catalog database 402 over time. The topics in a particular discipline may change over time as new events and information shape people's understanding of the discipline. These changes may be reflected in the rate at which authors of newly published documents mention each topic within a discipline in the documents. For example, newly published documents may include recently discovered topics more frequently than older documents, while older documents may include topics that are becoming obsolete in newer documents. Accordingly, the growth rate module 2005 evaluates topic growth rate based on the number of times a topic is mentioned in documents published at different times. The growth rate module 2005 compares the frequency of a topic in two or more sets of documents, where each set includes documents published at the same time or at similar times (e.g., documents published during the same year). For example, the growth rate module 2005 generates a growth rate for a topic between two publication years using the following equation:

$$\text{Topic Growth} = \frac{\text{Publication Year}_{Current} - \text{Publication Year}_{Previous}}{\text{Topic Frequency}_{Current} - \text{Topic Frequency}_{Previous}} \quad (4)$$

In one embodiment, the growth rate module 2005 determines the frequency of a topic in a set of documents by normalizing the number of occurrences of the topic in the set of documents to the total number of topics extracted from the documents in the set. In one embodiment, the growth rates for documents are normalized to a scale of −1 to 1, where a scaled growth rate of −1 indicates the topic is being deprecated or is likely to become obsolete in future publications and a scaled growth rate of 1 indicates the topic is surging.

The complexity module 2010 analyzes complexity of the topics extracted from documents of the content catalog database 402. In one embodiment, the topic complexity module 2010 generates an academic complexity, representing the relative complexity of academic courses teaching the topic, and a document complexity, representing the relative complexity of the topic within a course. To determine academic complexity of the topics, one embodiment of the topic complexity module 2010 generates a complexity classification engine using an ensemble of machine learning models. The complexity classification engine is trained using a training set of course numbers of educational courses, titles of documents used in the educational courses, and complexity labels assigned to the educational courses. For example, the training set includes courses with smaller course numbers (e.g., 101) labeled as introductory courses and courses with higher course numbers (e.g., 401) labeled as advanced courses. The topic complexity module 2010 applies the complexity classification engine to document titles to determine complexity of the document. For a topic identified by the topic extraction module 1505, the topic complexity module 2010 identifies an educational course using a document from which the topic was extracted, applies the complexity classification engine to the title of the identified document, and determines an academic complexity of the topic based on the complexity of the document.

To determine a document complexity of the topics, one embodiment of the topic complexity module 2010 determines locations of the topics in the documents from which they were extracted. As course documents are typically organized such that less complex topics are near the beginning of the document and more complex topics are near the end of the document, the topic complexity module 2010 determines a topic extracted from an earlier portion of a document to have a lower document complexity than a topic extracted from a later portion of the document.

The topic complexity module 2010 uses the determined document complexity and the academic complexity to determine an overall complexity of each topic. A process performed by the topic complexity module 2010 to generate complexity scores for topics is described further with respect to FIG. 21. The topic complexity module 2010 stores the complexity scores for each of the extracted topics. An example schema of a topic record stored by the topic progression module 1525 after the topic complexity module 2010 generates complexity scores for the topic is as follows:

```
{
"Topic" : "Logistic Regression",
    "TextBooks" : [
        {   "Taxonomy": "Statistics",
            "EAN": 9897981,
            "Publication Year" : 1998
            "Affinity Score": 0.95,
            "Occurrence": [
                {       "Chapter" : 1,
                        "Section" : [
                            {           "Id" : 1.2,
                                        "Pages" : [11, 13]
                            },
                            {           "Id" : 1.4,
                                        "Pages" : [21, 24]
                            }]
                },
                {
                        "Chapter" : 3,
                        "Section" : [
                            {           "Id" : 3.1,
                                        "Pages" : [76]
                            },
                            {           "Id" : 3.9,
                                        "Pages" : [150, 154]
                            }]
                }]
        },
        {   "Taxonomy": "Machine Learning",
            "EAN": 9898991,
            "Publication Year" : 2001
            "Affinity Score": 0.98,
            "Occurrence": [
                {   "Chapter" : 4,
                    "Section" : [
                        {           "Id" : 4.2,
                                    "Pages" : [131]
                        }]
                },
                {   "Chapter" : 12,
                    "Section" : [
                        {           "Id" : 12.5,
                                    "Pages" : [379]
                        },
                        {           "Id" : 12.7,
                                    "Pages" : [412, 413]
                        }]
                }]
        }],
    "Scores" : [
        {   "Taxonomy": "Machine Learning",
            "Aggregate Affinity": 0.98,
            "Complexity": { "Mean Academic" : [3.33, 4.66, 2.33],
"Mean Book" : [5.0, 2.33, 3.0]},
            "Related Topics": [
                        {"Topic RHS": "Linear Regression", "Support":0.45,
"Confidence": 0.32, "Lift": 14.88},
                        {"Topic RHS": "Support Vector Machines", "Support":
0.62, "Confidence":0.8, "Lift":21}
                ]
        },
        {   "Taxonomy": "Statistics",
            "Aggregate Affinity": 0.98,
            "Complexity": { "Mean Academic" : [1.4, 2.7, 2.33], "Mean
Book" : [3.1, 1.4, 2.2]},
            "Related Topics": [
                        {"Topic RHS": "Polynomial Regression", "Support" :
0.6, "Confidence":0.9, "Lift":32},
```

```
                    {"Topic RHS": "Multiple Linear Regression",
"Support" : 0.7, "Confidence":0.8, "Lift":19.12}
                    ]
            }
    ]
}
```

The progression analysis module 2015 generates a progression of the topics extracted from documents of the content catalog database 402. The topic progression is a sequence of topics ordered according to the complexity of the topics. To generate the progression, the progression analysis module 2015 sequentially selects a next topic to include in the progression based on the topic last added to the progression. For a first topic in the progression, the progression analysis module 2015 accesses the topic pairs generated by the topic pairing module 1515 to identify a set of topics paired to the first topic. From the set of paired topics, the progression analysis module 2015 identifies one or more topics having a higher complexity than the first topic. In one embodiment, the progression analysis module 2015 identifies topics having at least one complexity measure that is greater than a threshold amount above the complexity of the first topic. For example, the progression analysis module 2015 identifies a topic occurring at least a threshold number of pages after the first topic in documents of the content catalog database 402, or a topic occurring after the first topic by at least a threshold number of sections or subsections of the document. The progression analysis module 2015 may also apply an upper bound to the complexity of the selected topics, thereby limiting the increase in complexity from the first topic to the next topic in the progression.

The progression analysis module 2015 analyzes each pairing of the first topic and a topic identified to be more complex than the first topic as a candidate sequence to include in the progression. For each candidate sequence, the progression analysis module 2015 determines a frequency of the candidate sequence in documents of the content catalog 402. For example, if the topic A is the first topic and topics D, E, and F were identified as topics paired to topic A that are more complex than topic A, the progression analysis module 2015 determines the frequency of the ordered pairs (A,D), (A,E), and (A,F) by counting the number of times each of the topics D, E, and F appears after topic A in documents of the content catalog 402. The count for each candidate sequence is normalized to the sum of the counts for the candidate sequences.

In one embodiment, the progression analysis module 2015 identifies the candidate sequence occurring most frequently in the documents of the content catalog 402, and selects the topic in the identified sequence as the topic to follow the first topic in the progression. In another embodiment, the progression analysis module 2015 selects two or more candidate sequences occurring frequently in the documents, and uses the growth rate of the topics to select the next topic in the progression. For example, the progression analysis module 2015 selects a topic with the highest growth rate in the last year as the next topic for the progression.

The progression analysis module 2015 may also periodically update the progression based on the growth rate of the topics. For example, the progression analysis module 2015 periodically evaluates the growth rate of the topics in the most frequently occurring candidate sequences and selects the topic having the highest growth rate at the time of the evaluation as the topic to include in the progression.

The progression analysis module 2015 stores the one or more topics selected to follow a topic in a progression in the topic record stored by the topic progression module 1525. For example, the progression analysis module 2015 updates the schema of the topic "logistic regression" to include one or more progressive topics:

```
{
"Topic" : "Logistic Regression",
        "Textbooks" : [
                {       "Taxonomy": "Statistics",
                        "EAN": 9897981,
                        "Publication Year" : 1998
                        "Affinity Score": 0.95,
                        "Occurrence": [
                                {               "Chapter" : 1,
                                        "Section" : [
                                        {                               "Id" : 1.2,
                                                                        "Pages" : [11, 13]
                                        },
                                        {                               "Id" : 1.4,
                                                                        "Pages" : [21, 24]
                                        }]
                                },
                                {
                                                "Chapter" : 3,
                                        "Section" : [
                                        {                               "Id" : 3.1,
                                                                        "Pages" : [76]
                                        },
                                        {                               "Id" : 3.9,
                                                                        "Pages" : [150, 154]
                                        }]
                                }]
                },
```

```
{       "Taxonomy": "Machine Learning",
        "EAN": 9898991,
"Publication Year" : 2001
        "Affinity Score": 0.98,
        "Occurrence": [
        {       "Chapter" : 4,
                "Section" : [
                {           "Id" : 4.2,
                            "Pages" : [131]
                }]
        },
        {       "Chapter" : 12,
                "Section" : [
                {           "Id" : 12.5,
                            "Pages" : [379]
                },
                {           "Id" : 12.7,
                            "Pages" : [412, 413]
                }]
        }]
    }],
    "Scores" : [
        {       "Taxonomy": "Machine Learning",
                "Aggregate Affinity": 0.98,
                "Complexity": { "Mean Academic" : [3.33, 4.66, 2.33],
"Mean Book" : [5.0, 2.33, 3.0]},
                "Related Topics": [
                            {"Topic RHS": "Linear Regression",
"Support":0.45, "Confidence": 0.32, "Lift": 14.88},
                            {"Topic RHS": "Support Vector Machines",
"Support": 0.62, "Confidence":0.8, "Lift":21}
                ],
                "Progressive Topics: [
                            {"Sequential RHS": "Regularization", "Support":0.8
},
                            {"Sequential RHS": "Log likelihood", "Support":0.7
}
                ]
        },
        {       "Taxonomy": "Statistics",
                "Aggregate Affinity": 0.98,
                "Complexity": { "Mean Academic" : [1.4, 2.7, 2.33],
"Mean Book" : [3.1, 1.4, 2.2]},
                "Related Topics": [
                            {"Topic RHS": "Polynomial Regression", "Support"
: 0.6, "Confidence":0.9, "Lift":32},
                            {"Topic RHS": "Multiple Linear Regression",
"Support" : 0.7, "Confidence":0.8, "Lift":19.12}
                ],
                "Progressive Topics: [
                            {"Sequential RHS": "Maximum likelihood
estimation", "Support":0.6 },
                            {"Sequential RHS": "Regularization", "Support":0.4
}
                ]
        }
]
}
```

The playlist generation module 2020 generates a playlist of topics based on the topic progressions generated by the progression analysis module 2015. The playlist is a recommendation of topics for a user of the education platform 400 to study. For example, if a user accesses content of the education platform 400 associated with a topic in the progression, the playlist recommends a next topic in the progression to the user. The playlist generation module 2020 may display a visualization of the playlist to the user, enabling the user to see upcoming topics as the user navigates through the topic progression. In one embodiment, each topic displayed in the visualization is selectable to access a portion of a document including the topic. For example, in response to a user selection of a topic identified in the playlist, the playlist generation module 2020 retrieves a chapter of a document describing the selected topic and displays the chapter to the user.

Generating Topic Complexities

Figure 21:
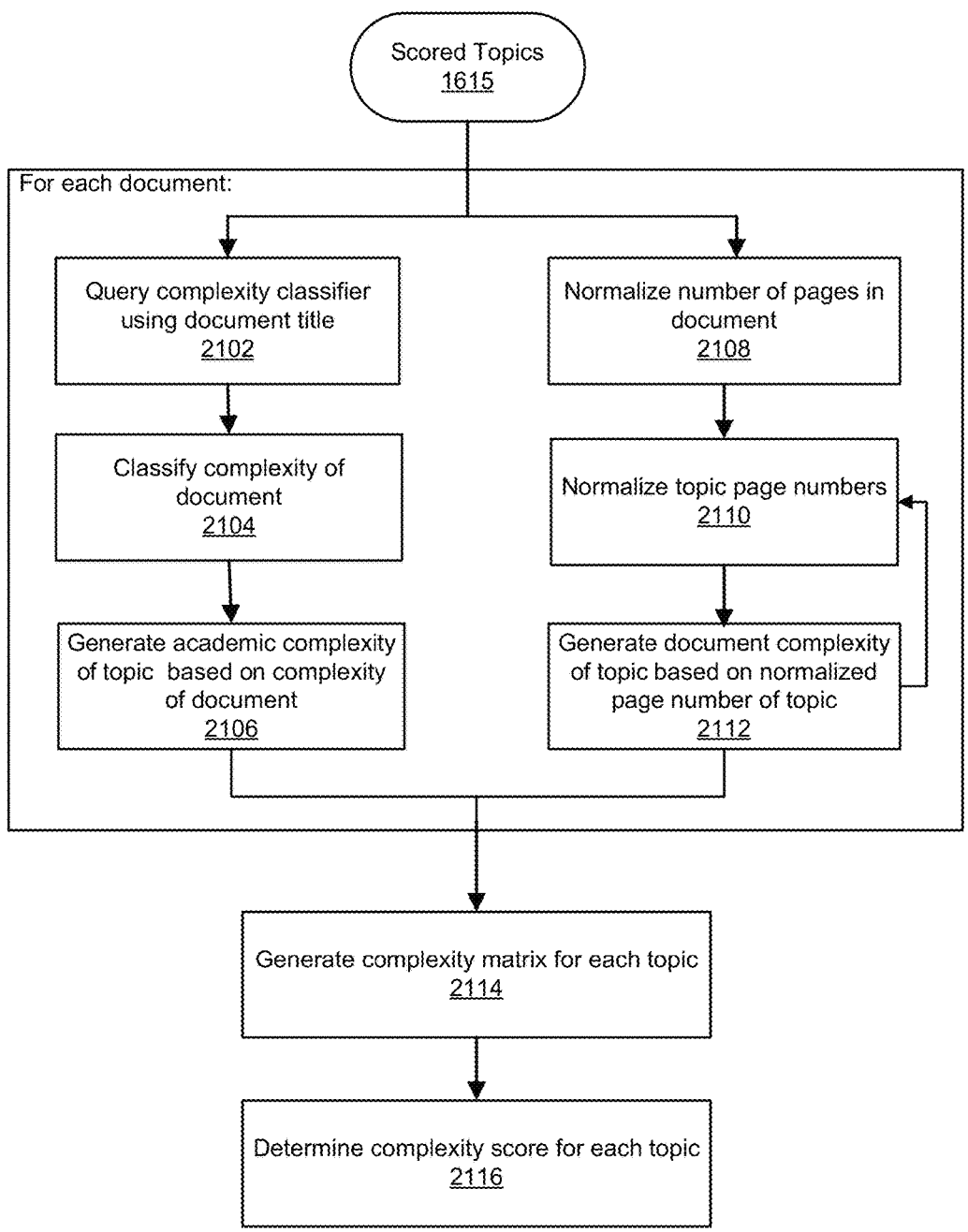
FIG. 21 is a flowchart illustrating a process for determining complexities of topics, according to one embodiment.

FIG. 21 is a flowchart illustrating a process for generating complexity scores of topics extracted from documents of the content catalog database 402. In one embodiment, the process shown in FIG. 21 is performed by the complexity module 2010 of the topic progression module 1525. Other embodiments of the process may include fewer, additional, or different steps, and the steps may be performed in different orders. In one embodiment, the process shown in FIG. 21 is performed for each of the scored topics 1615 output by the topic extraction module 1505. In another embodiment, the process shown in FIG. 21 is performed for each of the topics 1611 extracted from documents of the content catalog database 402, prior to scoring the affinity of the topics to nodes of the taxonomy.

As described above, the topic complexity module 2010 builds an academic complexity classification engine to predict a complexity label for any given document title. The academic complexity classification engine uses a complexity of an academic course to determine the relative complexity of a document referenced in the course. For each document including a particular topic, the topic complexity module 2010 queries 2102 the academic complexity classifier using the title of the document to classify 2104 the complexity of the document. The topic complexity module 2010 generates 2106 an academic complexity measure for the topic based on the determined complexity of the document. For example, a document and the topics appearing in the document are classified as having an academic complexity of "introductory," "intermediate," or "advanced." In one embodiment, each of the topics appearing in a document is assigned the same academic complexity measure as the document.

The topic complexity module 2010 also generates a document complexity measure for the topic for each appearance of the topic in each document. The document complexity measure represents varying complexities of different portions of each document from which the topic was extracted. To generate the document complexity measure, the topic complexity module 2010 normalizes 2108 the number of pages in a document to a specified number of pages. For example, the topic complexity module 2010 normalizes the number of pages in each document of the content catalog database 402 to 100 pages. The topic complexity module 2010 normalizes 2110 the page number associated with each topic to the normalized document scale. For example, a topic appearing on page 500 of a 1000-page document is normalized to page 50 of a 100-page scale.

Based on the normalized page numbers, the topic complexity module 2010 assigns one or more document complexity measures to the topic. In one embodiment, the topic complexity module 2010 divides the documents into a fixed number of sections, such as three. Each of the sections is assigned a document complexity measure. For example, if documents are divided into three sections, the first section in the document is assigned a low document complexity measure, the middle section is assigned an intermediate document complexity measure, and the third section is assigned a high document complexity measure. For each appearance of the topic in a document, the topic receives the document complexity measure assigned to the section of the document in which the topic appears.

As a topic may appear multiple times in a document, the topic complexity module 2010 repeats steps 2110 and 2112 for each appearance of the topic. Accordingly, the topic complexity module tallies the number of appearances of a topic in each of the sections of each document using the normalized page numbers to generate 2112 the document complexity measures of the topics. Furthermore, the topic complexity module 2010 repeats steps 2102-2112 for each document including the topic.

Using the academic and document complexities generated for each appearance of a topic in each document, the topic complexity module 2010 generates 2114 a complexity matrix for each topic in the set of scored topics 1615. The complexity matrix represents numbers of occurrences of a topic in each section of respective documents and the academic complexity of the documents in which the topic appears. An example complexity matrix is provided below.

|  |  | Academic Complexity | | |
|---|---|---|---|---|
|  |  | Introductory Document | Intermediate Document | Advanced Document |
| Document Complexity | Beginning Pages | 0 | 8 | 0 |
|  | Middle Pages | 3 | 2 | 1 |
|  | End Pages | 2 | 1 | 12 |

As an example, the topic corresponding to the example complexity matrix was extracted from at least one document assigned an intermediate complexity, and the topic appears a total of eight times in the first section (i.e., the beginning pages) of the documents assigned an intermediate academic complexity.

Using the complexity matrix, the topic complexity module 2010 determines 2116 a complexity score for each topic. In one embodiment, the topic complexity module generates a vector representing the mean academic complexity of a topic and a vector representing the mean document complexity of the topic. In one embodiment, the respective means represent a mean value of each column and row of the complexity matrix. For example, the example complexity matrix above yields a mean academic complexity of [1.667, 3.667, 4.33] and a mean document complexity of [2.667, 2, 5]. The vectors generated by the topic complexity module 2010 represent, respectively, the average number of appearances of the topic in introductory, intermediate, and advanced documents of the content catalog database 402, and the average number of appearances of the topic in the beginning section of documents, the middle section of documents, and the end section of documents, regardless of the taxonomic classification of the documents.

Example Topic Progression

Figure 22:
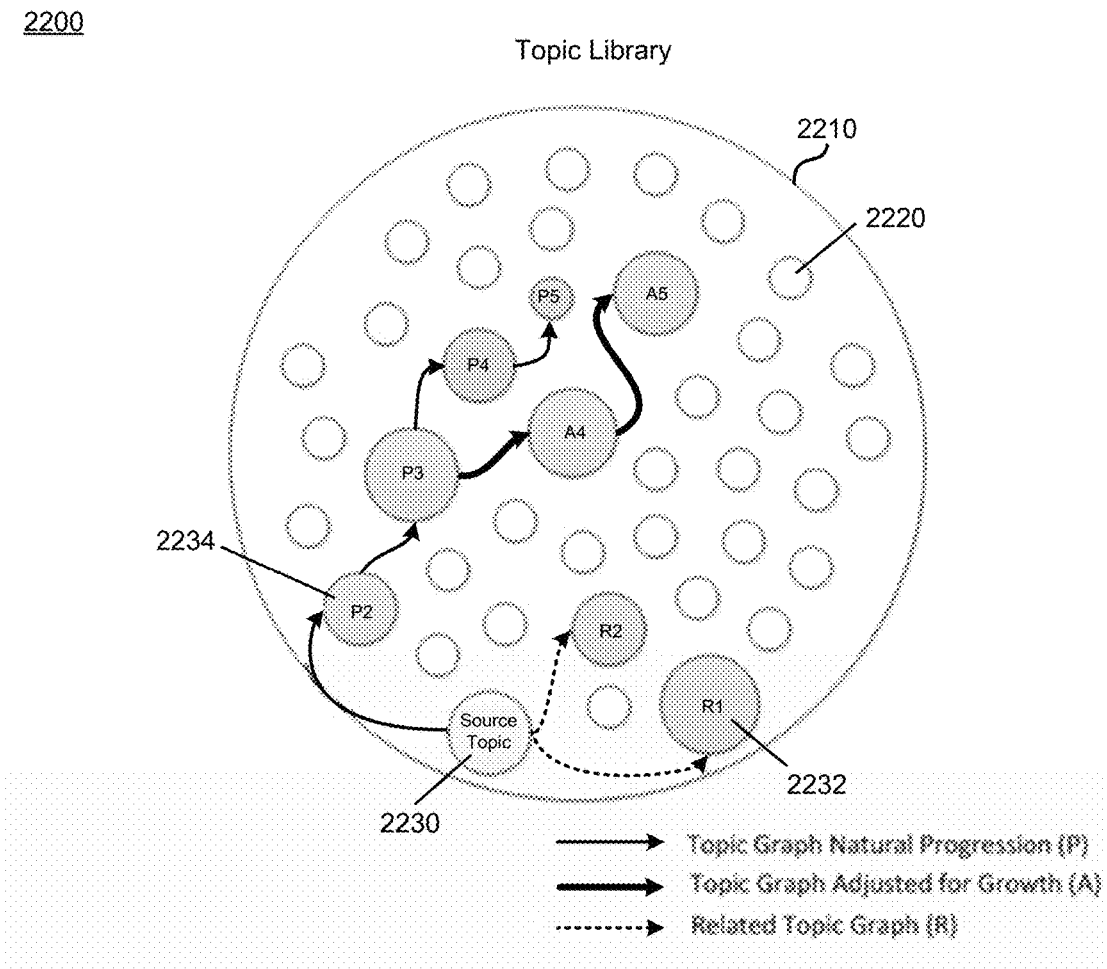
FIG. 22 illustrates an example visualization of a topic progression.

FIG. 22 is an example visualization 2200 of a topic progression generated by the topic progression module 1525 and displayed to a user of the education platform 400. The visualization 2200 represents a portion 2210 of the topics extracted from documents of the content catalog database 402, in which each bubble 2220 is an identifier of a topic. In one embodiment, the bubbles 2220 have varying sizes to represent the growth rate of the respective topics. For example, a larger bubble indicates the topic has a high growth rate (e.g., close to 1), while a smaller bubble indicates the topic has a low growth rate (e.g., close to −1). The growth rate of topics in the visualization 2200 may alternatively be represented differently, such as by color of the bubbles 2220 or position of the bubbles 2220 in the visualization 2200. Furthermore, in one embodiment, the relative complexity of the topics is represented by position of the corresponding bubbles in the visualization 2200, in which more complex topics are displayed at higher positions in the visualization. Other embodiments may display more complex topics at lower positions in the visualization 2200 or at positions farther to the right in the visualization 2200, or may otherwise spatially represent the relative complexities of the topics in the visualization 2200. Alternatively, the relative complexity of topics may be represented by size or color of the bubbles 2220 representing each of the topics.

The visualization 2200 provides one or more paths through the topics originating at a source topic 2230. The paths may include paths to one or more topics 2232 related to the source topic 2230, which may or may not be more complex than the source topic 2230. The paths also include at least one progression from the source topic 2230 to more complex topics 2234. In the example of FIG. 22, the visualization 2200 illustrates two progressions branching from the topic P3: one continuing to topics P4 and P5 and one continuing to topics A4 and A5. The topics P4 and P5 are more complex than the topic P3, but have a lower growth rate than the topics A4 and A5. Accordingly, the progression including topics A4 and A5 is adjusted for growth of the topics. The paths provided in the visualization 2200 may be document-independent. For example, a path may pass through topics appearing in the same document or different documents, and topics occurring later in the progression may appear earlier or later in a document than a previous topic in the progression. Furthermore, the visualization 2200 may include additional or fewer paths than are shown in FIG. 22, and the paths may each include fewer or additional topics.

In one embodiment, each bubble 2220 in the visualization 2200 is selectable to access content including the corresponding topic. For example, in response to a user selection of a bubble in the visualization 2200, the topic progression module 1525 retrieves a document or a portion of a document including the topic from the content catalog database 402 and displays the document to the user. A user can therefore navigate through the progression by selecting a topic in the visualization 2200, reviewing content associated with the topic, and selecting a next topic in the progression.

Figure 23:
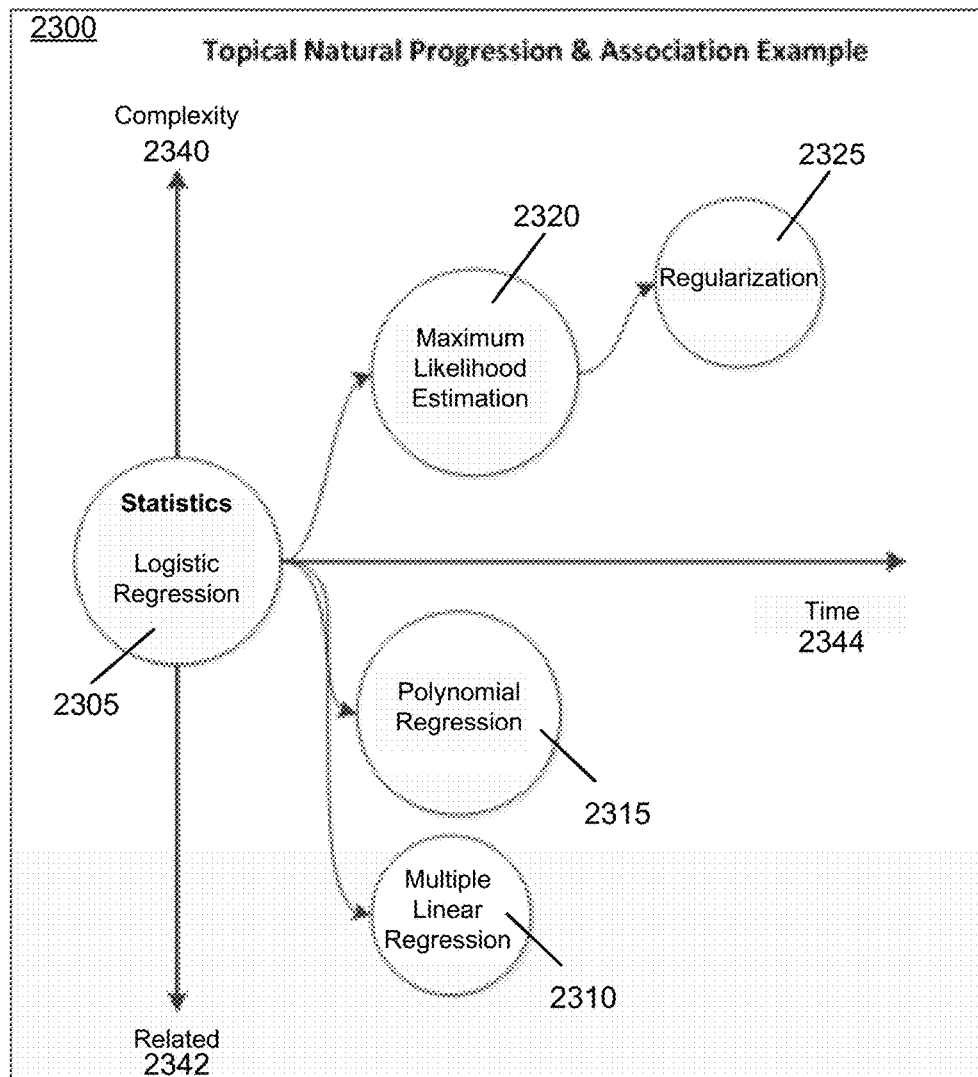
FIG. 23 illustrates another example visualization of a topic progression.

FIG. 23 is another example visualization 2300 of a topic progression, as a specific example of a portion of the visualization 2200 illustrated in FIG. 22. In the example of FIG. 23, the progression includes topics associated with statistics. The logistic regression topic 2305 is a source topic in the visualization 2300 (e.g., a topic currently being studied by a user). As described with respect to FIG. 22, the size, color, or position of identifiers of topics in the visualization 2300 may represent growth rate of the corresponding topics. For example, the visualization 2300 identifies a topic having a high growth rate by a larger bubble than is used to identify a topic having a low growth rate. In one embodiment, the source topic 2305 is displayed at the origin of a complexity axis 2340, a relatedness axis 2342, and a time axis 2344 in the visualization 2300. The position of a topic along the complexity axis 2340 and relatedness axis 2342 represent, respectively, the complexity of the topic relative to the source topic 2305 and the degree of relatedness of the topic to the source topic 2305. For example, in addition to the source topic 2305, the visualization 2300 also includes two related topics, multiple linear regression 2310 and polynomial regression 2315, and two more complex topics, maximum likelihood estimation 2320 and regularization 2325. As indicated in FIG. 23, the related topic polynomial regression 2315 is more closely related to logistic regression 2305 than is multiple linear regression 2310. Similarly, the regularization topic 2325 is more complex than maximum likelihood estimation 2320, which in turn is more complex than logistic regression 2305. The positions of the topics along the time axis 2344 represent an order in which the topic progression module 1525 recommends the user study the topics. For example, after studying logistic regression 2305, the topic progression module 1525 recommends the user study the more complex topic maximum likelihood estimation 2320.

In one embodiment, each topic identifier in the visualization 2300 is selectable to access content describing the corresponding topic. As a user accesses content associated with the topics in the visualization, the topic progression module 1525 progressively adds topics to the visualization 2300. To add a topic to the visualization 2300, the topic progression module 1525 may shift the topic currently accessed by the user to the origin of the complexity axis 2340, relatedness axis 2342, and time axis 2344. For example, after accessing content associated with logistic regression 2305, the user selects the identifier of maximum likelihood estimation 2320. In response to the user's selection, the topic progression module 1525 shifts the maximum likelihood estimation 2320 to the origin of the visualization 2300, displays a new identifier associated with a topic following regularization 2325 in the progression, and displays content associated with the selected topic to the user. The user can therefore navigate through a topic progression by interacting with the visualization 2300.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML or HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for recommending a topic to a user of a content management system, the method comprising:
   receiving a plurality of topics extracted from documents of the content management system;
   generating pairings between the received topics, a pairing between two topics generated responsive to the two topics appearing in proximity to one another in one or more of the documents;
   determining a numerical complexity of each received topic, the numerical complexity comprising at least one of a vector representing a mean academic complexity of the topic and a vector representing a mean document complexity of the topic;
   generating a progression of the topics based on the numerical complexities of the topics and the pairings between the topics, the progression comprising a sequential ordering of paired topics in which each topic in the ordering has a higher numerical complexity than a preceding topic in the ordering; and
   responsive to a user of the content management system accessing content associated with a topic in the progression, recommending a next topic in the progression to the user.

2. The method of claim 1, wherein generating the pairings between the received topics comprises:
   identifying two topics appearing in proximity to one another in one or more of the documents;
   scoring the two topics based on a degree of correlation between the two topics; and
   pairing the two topics responsive to the score being greater than a threshold.

3. The method of claim 1, wherein determining the numerical complexity of each received topic comprises, for a received topic:
   identifying an academic complexity for each document from which the topic was extracted;
   computing the mean academic complexity of the topic based on the identified academic complexities;
   identifying a normalized location of the topic in each document from which the topic was extracted;
   computing the mean document complexity of the topic based on the identified normalized locations of the topic; and
   determining the numerical complexity of the topic based on the mean document complexity and the mean academic complexity of the topic.

4. The method of claim 1, wherein the progression of topics is generated from a plurality of sequences of topics, and wherein selecting the sequences of topics to include in the progression comprises:
   generating a plurality of candidate sequences of the paired topics, each candidate sequence including two or more topics ordered according to the numerical complexities of the two or more topics;
   determining a frequency of each candidate sequence in the documents of the content management system; and
   responsive to the frequency of a candidate sequence exceeding a threshold, selecting the candidate sequence for inclusion in the progression of topics.

5. The method of claim 1, wherein the documents of the content management system include documents having a plurality of different publication dates, the method further comprising:
   generating a growth rate for each topic based on a frequency of the topic in documents published at different times;
   wherein the progression of topics is further generated based on the growth rate of the topics.

6. The method of claim 5, wherein generating the progression of topics based on the growth rate of the topics comprises:
   for a first topic in the progression, identifying a plurality of topics paired to the first topic that have a higher numerical complexity than the first topic; and
   selecting from the identified topics, a second topic to succeed the first topic in the progression based on the growth rate of the second topic, the second topic having a higher growth rate than other identified topics.

7. The method of claim 1, wherein recommending the next topic in the progression to the user comprises:
   displaying a portion of a document including the next topic to the user.

8. The method of claim 1, further comprising:
   displaying a representation of the progression of topics to the user, each topic in the representation selectable by the user to access a document from which the selected topic was extracted.

9. A non-transitory computer readable storage medium storing computer program instructions for recommending a topic to a user of a content management system, the computer program instructions when executed by a processor causing the processor to:
   receive a plurality of topics extracted from documents of the content management system;
   generate pairings between the received topics, a pairing between two topics generated responsive to the two topics appearing in proximity to one another in one or more of the documents;
   determine a numerical complexity of each received topic, the numerical complexity comprising at least one of a vector representing a mean academic complexity of the topic and a vector representing a mean document complexity of the topic;

generate a progression of the topics based on the numerical complexities of the topics and the pairings between the topics, the progression comprising a sequential ordering of paired topics in which each topic in the ordering has a higher numerical complexity than a preceding topic in the ordering; and responsive to a user of the content management system accessing content associated with a topic in the progression, recommend a next topic in the progression to the user.

10. The non-transitory computer readable storage medium of claim 9, wherein the computer program instructions causing the processor to generate the pairings between the received topics comprise instructions that when executed by the processor cause the processor to:

identify two topics appearing in proximity to one another in one or more of the documents;

score the two topics based on a degree of correlation between the two topics; and pair the two topics responsive to the score being greater than a threshold.

11. The non-transitory computer readable storage medium of claim 9, wherein the computer program instructions causing the processor to determine the numerical complexity of each received topic comprise instructions that when executed by the processor cause the processor to, for a received topic:

identify an academic complexity for each document from which the topic was extracted;

compute the mean academic complexity of the topic based on the identified academic complexities;

identify a normalized location of the topic in each document from which the topic was extracted;

compute the mean document complexity of the topic based on the identified normalized locations of the topic; and determine the numerical complexity of the topic based on the mean document complexity and the mean academic complexity of the topic.

12. The non-transitory computer readable storage medium of claim 9, wherein the progression of topics is generated from a plurality of sequences of topics, and wherein the computer program instructions causing the processor to select the sequences of topics to include in the progression instructions that when executed by the processor cause the processor to:

generate a plurality of candidate sequences of the paired topics, each candidate sequence including two or more topics ordered according to the numerical complexities of the two or more topics;

determine a frequency of each candidate sequence in the documents of the content management system; and responsive to the frequency of a candidate sequence exceeding a threshold, select the candidate sequence for inclusion in the progression of topics.

13. The non-transitory computer readable storage medium of claim 9, wherein the documents of the content management system include documents having a plurality of different publication dates, further comprising computer program instructions causing the processor to:

generate a growth rate for each topic based on a frequency of the topic in documents published at different times;

wherein the progression of topics is further generated based on the growth rate of the topics.

14. The non-transitory computer readable storage medium of claim 13, wherein the computer program instructions causing the processor to generate the progression of topics based on the growth rate of the topics comprise computer program instructions that when executed by the processor cause the processor to:

for a first topic in the progression, identify a plurality of topics paired to the first topic that have a higher numerical complexity than the first topic; and select from the identified topics, a second topic to succeed the first topic in the progression based on the growth rate of the second topic, the second topic having a higher growth rate than other identified topics.

15. The non-transitory computer readable storage medium of claim 9, wherein the computer program instructions causing the processor to recommend the next topic in the progression to the user comprise computer program instructions that when executed by the processor cause the processor to:

display a portion of a document including the next topic to the user.

16. The non-transitory computer readable storage medium of claim 9, further comprising computer program instructions that when executed by the processor cause the processor to:

display a representation of the progression of topics to the user, each topic in the representation selectable by the user to access a document from which the selected topic was extracted.

17. The non-transitory computer readable storage medium of claim 9, wherein determining a complexity measure for documents of the content Management system from which the received topic was extracted comprises:

applying, to titles of the documents, a complexity classification engine trained using an ensemble of machine learning models.

18. A method for recommending a topic to a user of a content management system, the method comprising:

extracting a plurality of topics from documents stored by the content management system;

identifying topics, from the plurality of extracted topics, that appear in proximity to one another in the documents stored by the content management system from which the topics were extracted;

for the topics identified as appearing in proximity to one another, determining a degree of correlation between the topics;

generating pairings between the topics identified as appearing in proximity to one another based on the degree of correlation between the topics;

determining a numerical complexity of each extracted topic, the numerical complexity comprising at least one of a vector representing a mean document complexity of the topic that is based on a complexity for each document from which each topic was extracted, and a vector representing a mean an academic complexity of the topic that is based on normalized locations of each topic within each document from which each topic was extracted;

generating a progression of the topics based on the numerical complexities complexity of the topics and the pairings between the topics, the progression comprising a sequential ordering of paired topics in which each topic in the ordering has a higher complexity than a preceding topic; and responsive to a user of the content management system accessing content associated with a topic in the progression, recommending a next topic in the progression to the user.

* * * * *

UNITED STATES PATENT AND TRADEMARK OFFICE
CERTIFICATE OF CORRECTION

PATENT NO. : 9,852,132 B2
APPLICATION NO. : 14/553798
DATED : December 26, 2017
INVENTOR(S) : Charmy Chhichhia and Vincent Le Chevalier Page 1 of 1

It is certified that error appears in the above-identified patent and that said Letters Patent is hereby corrected as shown below:

In the Claims

Column no: 38, Line(s): 53-54, Claim 18, replace "mean an academic complexity" with -- mean academic complexity --
Column no: 38, Line(s): 57-58, Claim 18, replace "numerical complexities complexity" with -- numerical complexities --
Column no: 38, Line(s): 60-61, Claim 18, replace "higher complexity" with -- higher numerical complexity --

Signed and Sealed this
Twenty-ninth Day of May, 2018

Andrei Iancu
*Director of the United States Patent and Trademark Office*